United States Patent
Ordentlich et al.

(10) Patent No.: US 7,623,725 B2
(45) Date of Patent: Nov. 24, 2009

(54) METHOD AND SYSTEM FOR DENOISING PAIRS OF MUTUALLY INTERFERING SIGNALS

(75) Inventors: Erik Ordentlich, San Jose, CA (US); Gadiel Seroussi, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 470 days.

(21) Appl. No.: 11/250,831

(22) Filed: Oct. 14, 2005

(65) Prior Publication Data

US 2007/0086058 A1 Apr. 19, 2007

(51) Int. Cl.
- G06K 9/40 (2006.01)
- G06K 1/00 (2006.01)
- G06F 15/00 (2006.01)
- H04N 1/40 (2006.01)
- H04N 1/38 (2006.01)

(52) U.S. Cl. .................. 382/254; 382/275; 358/1.9; 358/447; 358/461; 358/463

(58) Field of Classification Search .................. None
See application file for complete search history.

(56) References Cited

U.S. PATENT DOCUMENTS

| | | | |
|---|---|---|---|
| 4,079,202 A * | 3/1978 | Payne | 370/203 |
| 4,835,690 A * | 5/1989 | Gangarosa et al. | 600/410 |
| 5,072,452 A * | 12/1991 | Brown et al. | 704/256.4 |
| 5,148,489 A * | 9/1992 | Erell et al. | 704/226 |
| 5,682,501 A * | 10/1997 | Sharman | 704/260 |
| 5,754,695 A * | 5/1998 | Kuo et al. | 382/228 |
| 5,787,198 A * | 7/1998 | Agazzi et al. | 382/196 |
| 5,832,137 A | 11/1998 | Knox | |
| 5,850,448 A * | 12/1998 | Ganesan | 713/184 |
| 6,223,319 B1 * | 4/2001 | Ross et al. | 714/755 |
| 6,263,467 B1 * | 7/2001 | Hladik et al. | 714/755 |
| 6,288,798 B1 | 9/2001 | Sharma | |
| 6,516,437 B1 * | 2/2003 | Van Stralen et al. | 714/755 |
| 6,535,850 B1 * | 3/2003 | Bayya | 704/239 |
| 6,634,007 B1 * | 10/2003 | Koetter et al. | 714/784 |
| 6,772,120 B1 * | 8/2004 | Moreno et al. | 704/256 |
| 2003/0018457 A1 * | 1/2003 | Lett et al. | 703/11 |
| 2005/0197587 A1 * | 9/2005 | Rudy et al. | 600/509 |
| 2005/0237951 A1 * | 10/2005 | Yang et al. | 370/256 |
| 2005/0289433 A1 * | 12/2005 | Weissman et al. | 714/755 |
| 2006/0045218 A1 * | 3/2006 | Ordentlich et al. | 375/346 |
| 2006/0047484 A1 * | 3/2006 | Seroussi et al. | 702/191 |
| 2006/0088187 A1 * | 4/2006 | Clarkson et al. | 382/103 |
| 2006/0274861 A1 * | 12/2006 | Langenbach et al. | 375/341 |
| 2007/0140375 A1 * | 6/2007 | Jeanne et al. | 375/295 |
| 2008/0031315 A1 * | 2/2008 | Ramirez et al. | 375/232 |

OTHER PUBLICATIONS

Weissman, T, et al., Universal Discrete Denoising; Oct. 20-25, 2002 p. 11-14.*

(Continued)

Primary Examiner—Vikkram Bali
Assistant Examiner—Michelle Entezari

(57) ABSTRACT

In various embodiments of the present invention, a number n of mutually interfering signals are denoised by selecting a discrete universal denoiser method that denoises n mutually interfering signals, tuning the discrete universal denoiser to denoise the n mutually interfering signals, and denoising the n mutually interfering signals by applying the tuned discrete universal denoiser to the n mutually interfering signals.

21 Claims, 22 Drawing Sheets

OTHER PUBLICATIONS

Sharma, G., "Show-through concellation in scans of duplex printed documents", IEEE Xplore, May 2001, vol. 10, Issue 5.

Dubois, Eric et al., "Reduction of Bleed-through in scanned manuscript documents", Society for Imaging Science and Technology, 2001.

Payhak, Anita, "Restortion of documents with Show-through Distortion", 2000, Univeristy of Ottawa.

Dubois, Eric et al., "Joint Compression and Restoration of Documents with bleed-through", The Society for Imaging Science and Technology, 2004.

* cited by examiner

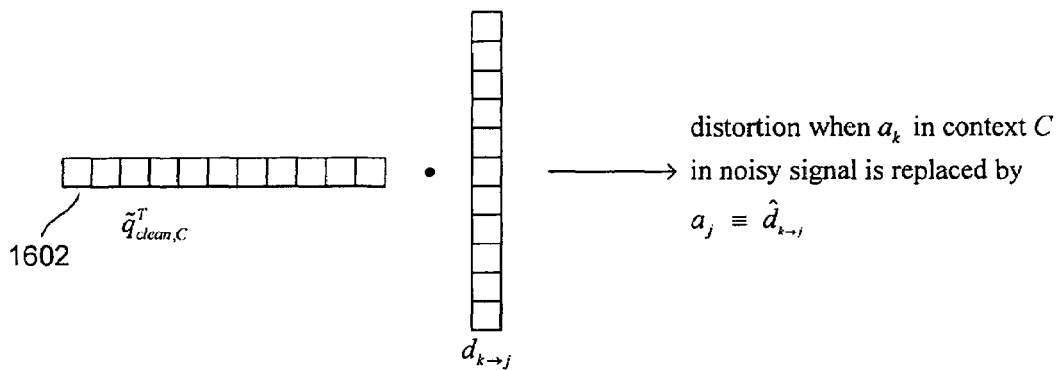
*Figure 16*
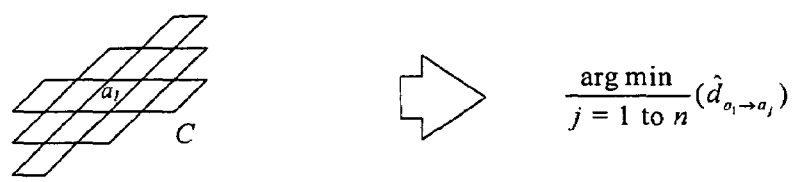
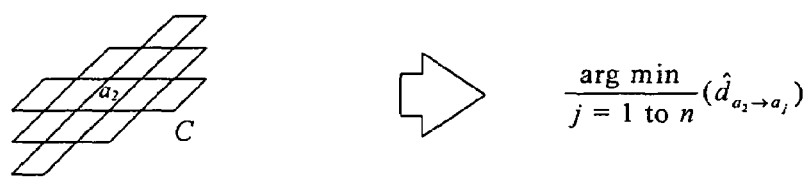
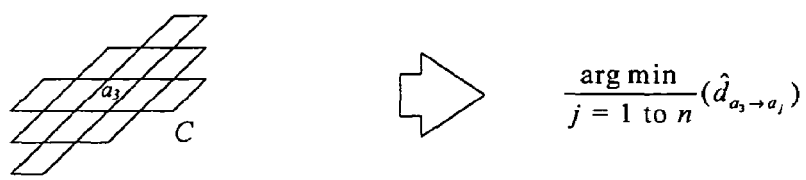
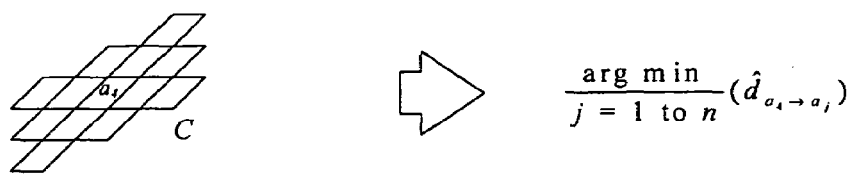
*Figure 17*

METHOD AND SYSTEM FOR DENOISING PAIRS OF MUTUALLY INTERFERING SIGNALS

TECHNICAL FIELD

The present invention is related to data and signal processing, is more specifically related to denoising noisy signals received from noise-introducing channels and, in particular, is related to a method and system for denoising pairs of mutually interfering signals, including a pair of images of both sides of a page included in a two-sided document.

BACKGROUND OF THE INVENTION

Whenever information is electronically encoded as original, or clean, data, and then transferred from the data source to a data destination, noise may be introduced by the transfer process, resulting in alteration of the original, clean data and reception by the data destination as noisy data. For example, when information is electronically encoded as a sequence of binary bits and sent through a communications network, such as a local Ethernet, to a destination node, there is a small probability that any given bit within the original, or clean, sequence of binary bits ends up being corrupted during transfer through the Ethernet, resulting in a "0" bit in the clean data being altered to a "1" bit in the noisy data received at the destination node, or a "1" bit in the clean data altered to a "0" bit in the noisy data received at the destination node. Although electronic communications media are classic examples of noisy channels, almost any type of data transfer or storage may result in data corruption, and may be modeled as a noisy channel. For example, there is a small probability associated with each bit of a block of binary data that the bit will be altered when the block of data is stored and then retrieved from a hard disk, or even when the block of data is transferred from local cache memory to global random-access memory within a computer system. In general, redundant data, including check sums and cyclical redundancy codes, are embedded into data encodings to allow noise-corrupted data to be detected and repaired. However, the amount of redundant data needed, and the accompanying costs and inefficiencies associated with redundant data, grows as the level of undetectable and/or unrepairable data corruption decreases.

In many cases, data corruption may occur prior to a point in a process at which redundant information can be embedded into a data signal to facilitate error detection and correction. As one example, a scanner that optically scans a printed document to produce a digital, electronic encoding of an image of the document can be viewed as a noisy channel in which discrepancies between the digitally encoded image of the document and the original document may arise. Such discrepancies may be introduced by a variety of optical and electronic components within the scanner that focus an optical image of the document onto a light-detecting component that transforms the detected optical image into an electronically encoded image of the document. When the digitally encoded image of the document is displayed or printed, different types of noise may be perceived as graininess, irregularities along the edges of text characters or objects within graphical images, uneven shading or coloration, random speckling, or other such visually distinguishable differences between the printed or displayed version of the digitally encoded data and the original document.

Denoising techniques can be applied to a noisy, digitally encoded image in order to produce a denoised, digitally encoded image that more accurately represents the original document that was scanned to produce the noisy, digitally encoded image. Recently, a discrete universal denoiser method ("DUDE") has been developed for denoising the noisy output signal of a discrete, memory-less data-transmission channel without relying on knowledge of, or assumptions concerning, the statistical properties of the original, or clean, signal input to the discrete, memory-less channel. Even more recently, the DUDE method has been extended for denoising continuous tone images, such as scanned documents or images. The extended DUDE method is referred to as the "DUDE-CTI method," or simply as the "DUDE-CTI." The DUDE-CTI is intended for use in a variety of image and data scanning, processing, and transfer applications.

One problem that is encountered in scanning printed documents is that, for a variety of reasons, information printed on the opposite side of a page from the side of the page being scanned may physically or optically bleed through the document substrate and interfere with information printed on the side of the document being scanned. In such cases, the resulting digital representation of the scanned side of the document may include noise introduced by the scanning process, such as Gaussian-like and salt-and-pepper noise, but also a generally attenuated, mirrored image of the information printed on the opposite side of the document, or, in other words, bleed-through noise. This type of distortion, when optically induced, is referred to as "show-through" noise. The term "bleed-through" is used to collectively refer to both physically and optically induced partial appearance of the reverse side of the document in the scanned image.

Bleed-through noise is a well-recognized problem in scanning, and has been addressed by a number of different techniques based on information theory and mathematics. The bleed-through-noise problem has been addressed, with varying levels of success, using special-purpose methods and components that may add cost and complexity to scanning and copying devices, and that may interfere with other denoising techniques used to address Gaussian-like, salt-and-pepper, and other types of noise encountered in optical scanning processes. Therefore, information-theory researchers, denoiser-method developers, and manufacturers and users of a variety of devices and systems that employ optical scanning of printed documents, such as scanners and copiers, have all recognized the need for more effective, general denoising techniques and systems that can, in integrated fashion, address general types of noise introduced by optical scanning processes as well as the bleed-through noise frequently encountered in optical scanning of printed documents. Similarly, needs for general denoising techniques and systems that can, in integrated fashion, address different types of noise introduced into various types and numbers of signals, resulting in mutually interfering signals, have been recognized by researchers, signal processors, and users of various types of signal processing equipment.

SUMMARY OF THE INVENTION

In various embodiments of the present invention, a number n of mutually interfering signals are denoised by selecting a discrete universal denoiser method that denoises n mutually interfering signals, tuning the discrete universal denoiser to denoise the n mutually interfering signals, and denoising the n mutually interfering signals by applying the tuned discrete universal denoiser to the n mutually interfering signals.

BRIEF DESCRIPTION OF THE DRAWINGS

FIG. 16 illustrates the computation of an estimate of the distortion produced by replacing symbol $a_k$ within context C in a noisy signal by the replacement symbol $a_j$.

FIG. 17 illustrates a symbol-replacement function $g(C,z)$.

DETAILED DESCRIPTION OF THE INVENTION

In various embodiments of the present invention, the DUDE-CTI method, systems incorporating the DUDE-CTI method, and denoising systems and methods similar to the DUDE-CTI method are tuned to address both random or pseudorandom image-acquisition-introduced noise, such as Gaussian and salt-and-pepper noise, as well as bleed-through noise introduced by various properties and characteristics of printed documents and scanning systems. In one embodiment of the present invention, the channel-noise model of the DUDE-CTI method, or a similar method, and systems incorporating the DUDE-CTI method or similar methods, is modified to model empirical parameters that characterize bleed-through noise, and remaining DUDE-CTI parameters, or parameters of a similar denoiser, are tuned to address both random or pseudorandom image-acquisition-introduced noise, such as Gaussian and salt-and-pepper noise, as well as bleed-through noise introduced by various properties and characteristics of printed documents and scanning systems. The DUDE-CTI method, or similar method, is then applied to a combined signal comprising aligned digital representations of both sides of a printed page or document in order to take advantage of redundant information in the combined signal to more effectively remove bleed-through noise. Similarly, a variety of different DUDE-CTI-based and DUDE-CTI-like embodiments of the present invention can be implemented to address a variety of additional types and numbers of mutually interfering signals. In a following subsection, application of the DUDE-CTI approach to denoising scanned images of printed documents, and other signals in which bleed-through noise may be present, is described with reference to several embodiments of the present invention.

DUDE-CTI

Figure 1:
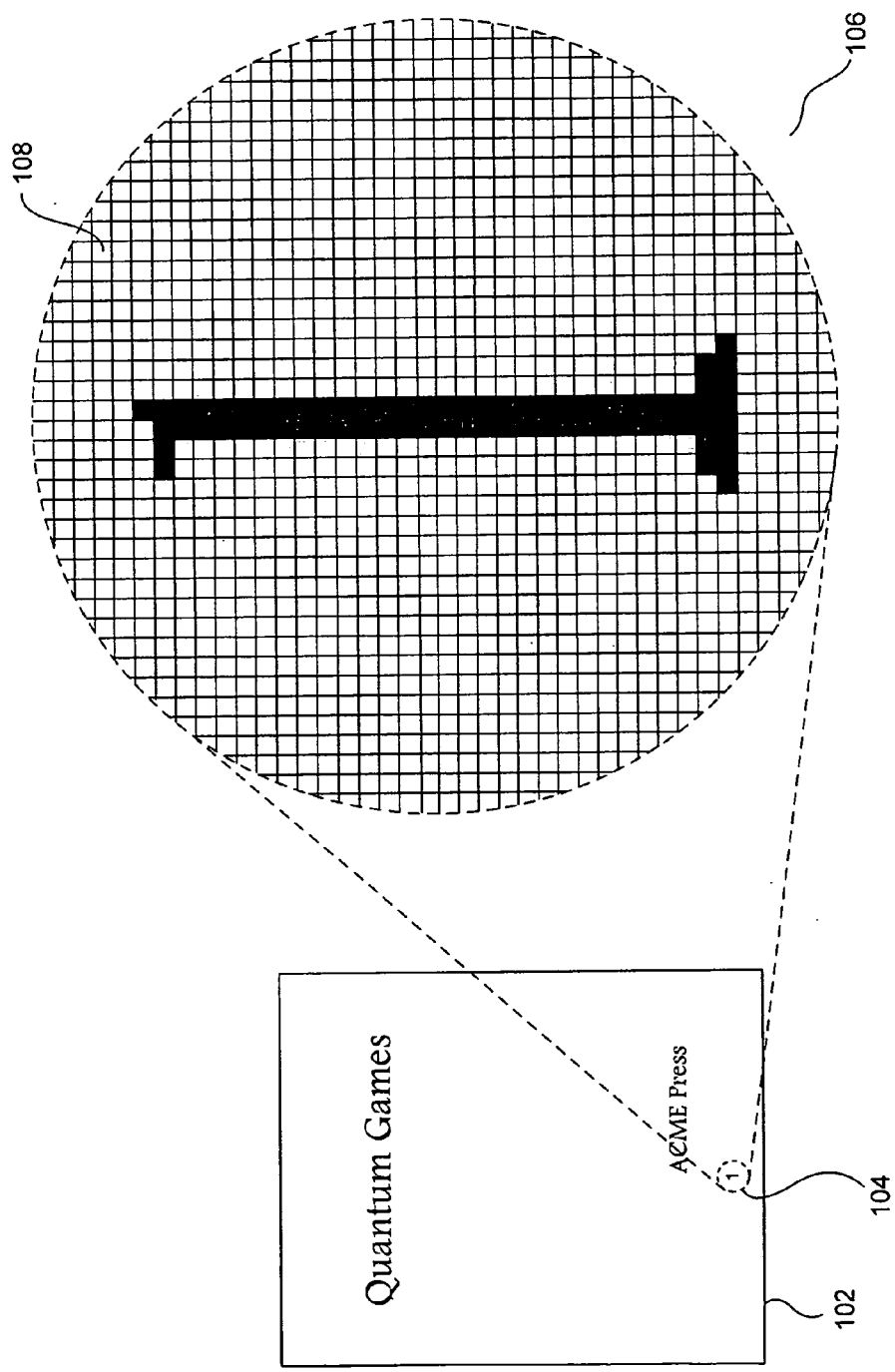
FIG. 1 illustrates digital encoding of a printed document to produce a clean image signal.

FIG. 1 illustrates digital encoding of a printed document to produce a clean image signal. In FIG. 1, a displayed image 102 of a digitally encoded title page is shown, with a small disk-like region 104 of the displayed document shown at a higher magnification 106. The document is displayed as an array of square pixels, such as pixel 108, and the digital encoding of the document comprises a sequence of integers, each integer representing an intensity value of a corresponding pixel. Commonly, for multi-level document images, pixel values range over a grayscale range from 0, indicating black, to 255, indicating white, with a continuous range of intermediate gray tones encoded by the integers 1-254. The integers 0-255 can therefore be considered to be symbols of a 256-symbol alphabet. Different techniques may be used to encode colored images. In one technique, three different grayscale-like encodings are used to encode intensity values of three primary colors, and the three different encodings are simultaneously displayed or rendered by a three-primary-color display or rendering device. Alternatively, a larger range of integer values may be used to encode a full range of color and intensity values in a single integer field. Thus, a pixel corresponds to a small region of a displayed or printed image, and the integer value associated with a pixel in a digitally encoded image represents the intensity, or both the color and intensity, for display or rendering of the pixel on a display or rendering device.

Figure 2:
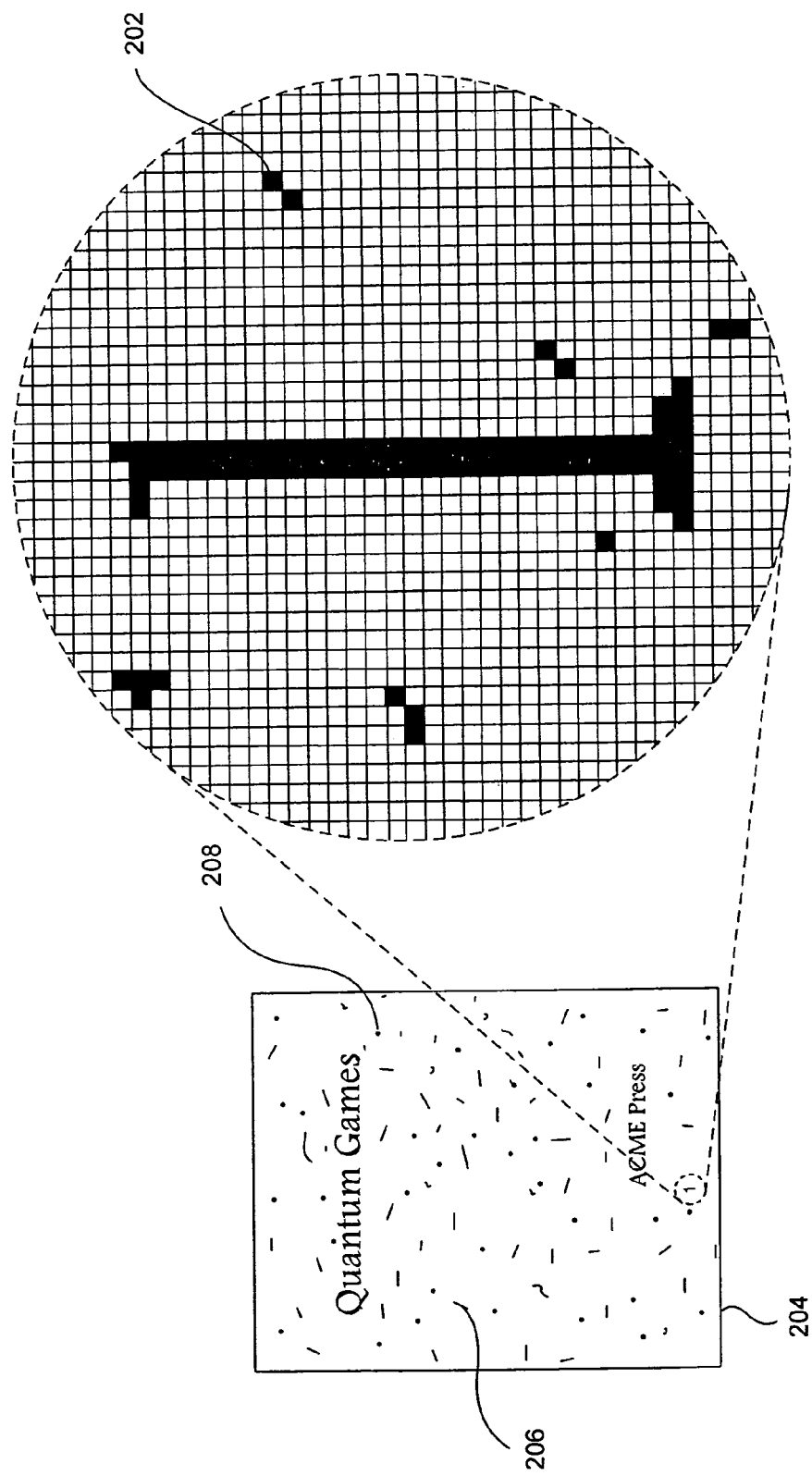
FIG. 2 illustrates a noisy signal corresponding to the clean image signal discussed with reference to in FIG. 1.

A printed document that is to be scanned by a scanning device can be considered as a clean signal. In other words, the printed document can be viewed as a large set of pixel-intensity values that, when displayed or printed, would appear visually indistinguishable from the original, printed document. The pixel data actually obtained as a result of scanning may be considered to be a noisy signal. FIG. 2 illustrates a noisy signal corresponding to the clean image signal discussed with reference to in FIG. 1. In comparing FIG. 2 to FIG. 1, it is easily observed that a number of pixels, such as pixel 202, have intensity values different from the values that the pixels would be expected to have based on the original, clean image shown in FIG. 1. The corresponding noisy image 204 is seen to have a number of visually discernable distortions, such as streaks 206 and speckles 208. In a scanning application, the original document represents the clean image signal, and the digitally encoded document produced by scanning the original document represents the noisy image signal. In various other applications, the clean signal may be an initial, digitally encoded document or other information source, and the noisy signal may be the corresponding digitally encoded document or other information source received following transmission of the clean signal through a communications medium or retrieved following storage of the clean signal in a volatile or non-volatile electronic data-storage device.

Figure 3A:
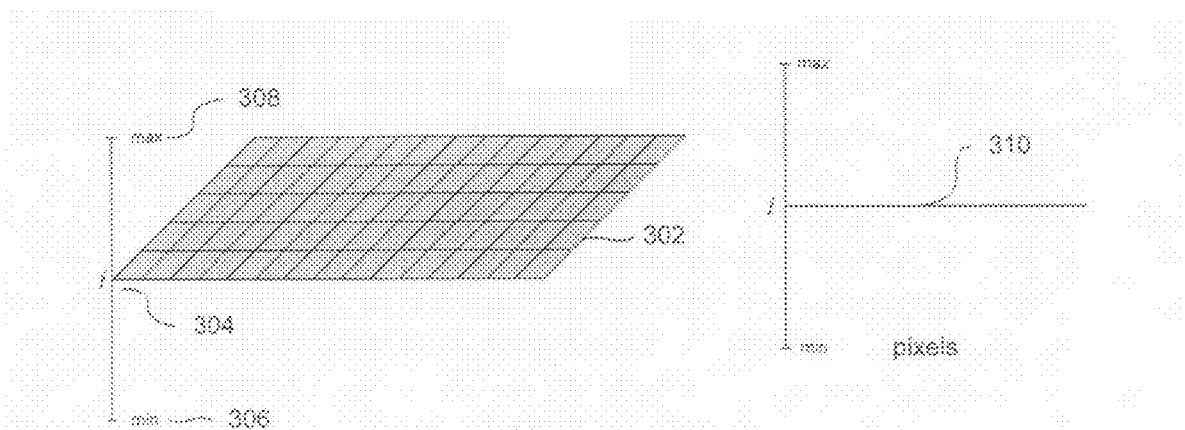
FIGS. 3A-C illustrate salt-and-pepper noise and Gaussian noise.
Figure 3B:
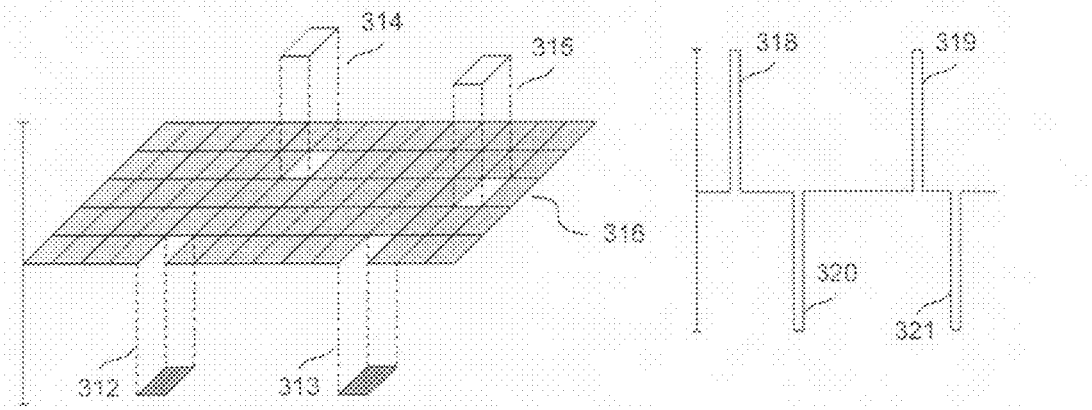
Figure 3C:
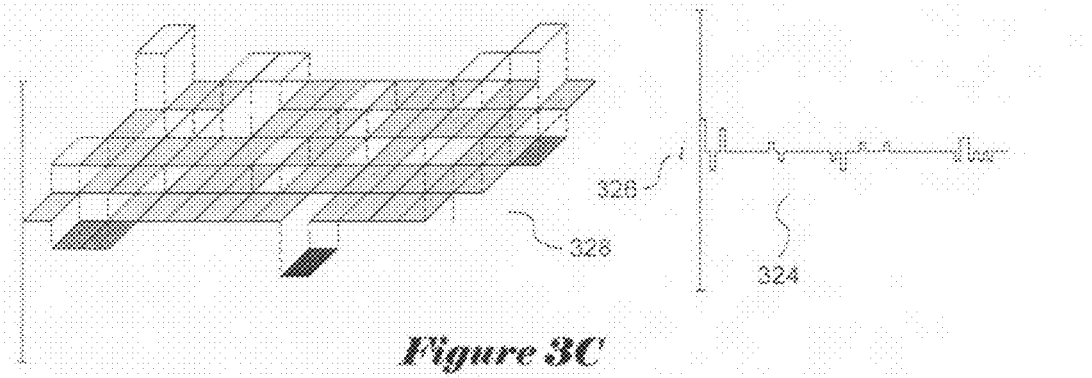

FIGS. 3A-C illustrate salt-and-pepper noise and Gaussian noise. FIG. 3A shows a small portion of a digitally encoded image 302, all pixels of which have a uniform intensity value i 304 with respect to a range of pixel-intensity values from a minimum value 306 to a maximum value 308. A two-dimensional graph of the intensity values of individual pixels from the region, in which pixels are taken in some particular linear order from the two-dimensional image, produces a straight, horizontal line 310. FIG. 3B illustrates salt-and-pepper noise added to the small region of uniform pixel intensity shown in FIG. 3A. Salt-and-pepper noise can be modeled as independent probabilities, associated with each pixel, that the intensity value associated with the pixel is altered, or corrupted, by a noisy channel to have either a minimum intensity value or a maximum intensity value. In FIG. 3B, two pixels 312-313 have intensity values altered to the minimum intensity value and two pixels 314-315 have intensity values altered to the maximum intensity value. A two-dimensional graph of the pixel intensity values for the pixels of the small region 316 of an image with added salt-and-pepper noise is seen to exhibit a number of narrow spikes 318-321 corresponding to pixels with altered, or corrupted, intensity values. FIG. 3C illustrates Gaussian noise added to the small region of uniform pixel intensity shown in FIG. 3A. Gaussian noise may be modeled as the addition of a value of an independent Gaussian random variable, associated with each pixel, to the pixel intensity value of the pixel. In one convenient mathematical model, the Gaussian random variables are considered to be independent, and to be identically distributed. Actual Gaussian-like noise produced by various types of noisy channels may not exhibit independent and identical distributions of alterations in pixel intensities, but a model employing independent and identically distributed Gaussian random variables often serves as a reasonable approximation for different types of Gaussian-like noise, and provides a tractable and computable mathematical framework for analysis of the noise. A two-dimensional graph of the pixel intensity values of the small region of an image shown in FIG. 3A with added Gaussian noise shows random fluctuations 324 about an expected pixel intensity i 326 for the small region of the image 328.

A discrete universal denoiser for continuous-tone images ("DUDE-CTI") has been developed for general denoising of digitally encoded images, and other noisy data. The DUDE-CTI method is next described to establish a conceptual framework for the following description of the present invention.

Figure 4A:
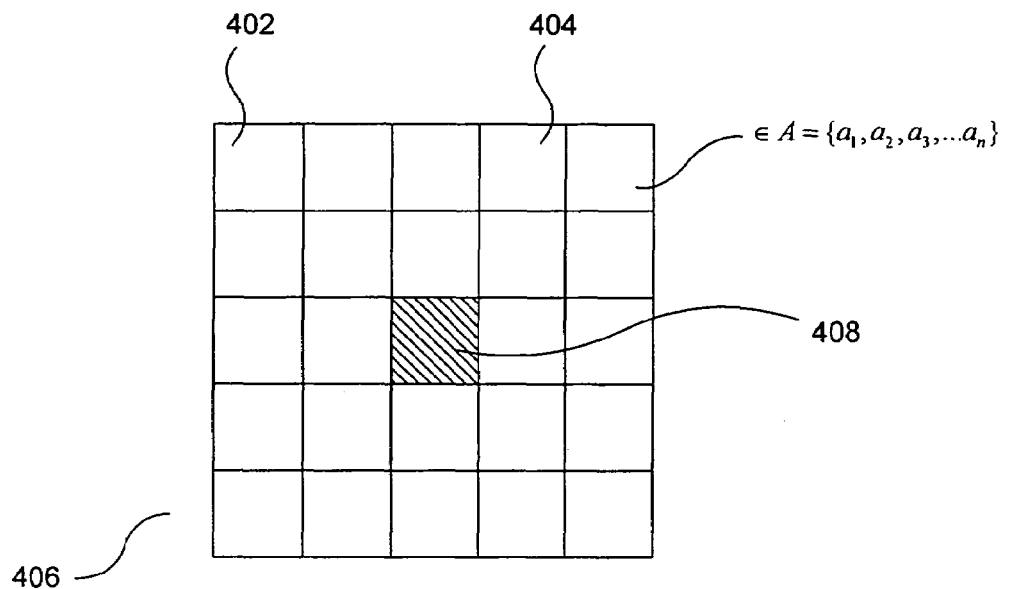
FIGS. 4A-B illustrate two different, well defined context neighborhoods that may be employed during analysis and denoising of image signals.
Figure 4B:
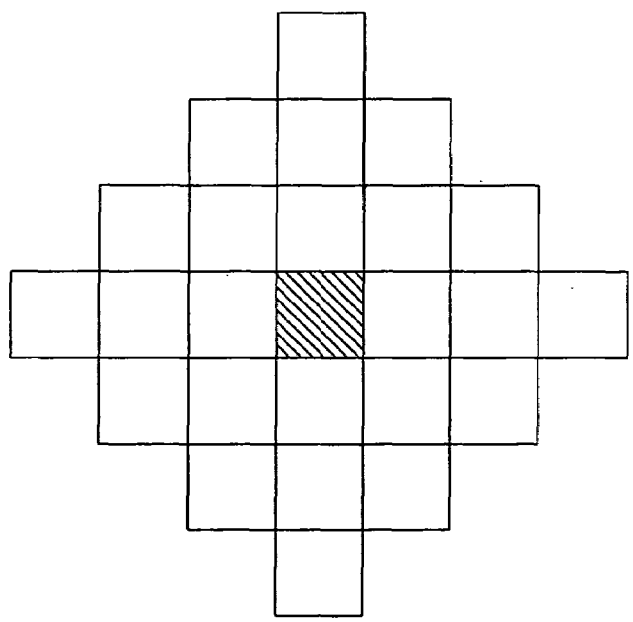

In the DUDE-CTI, an image signal, or digitally encoded image, is considered to be a two-dimensionally-ordered sequence of symbols, each symbol mapped to one of a finite set of numerical values. Most of the symbols in a signal have well-defined two-dimensional contexts, or neighborhoods, and these contexts play a significant role in the DUDE-CTI method. FIGS. 4A-B illustrate two different, well defined contexts that may be employed during analysis and denoising of image signals. Each square, such as square 402 in FIG. 4A, represents a single pixel intensity value within an image signal. As shown in FIG. 4A, the pixel intensity value associated with a pixel, such as the pixel intensity value associated with pixel 404, is considered during analysis and denoising as a symbol $z_i$ chosen from a finite alphabet $A \equiv \{a_1, a_2, a_3, \ldots a_n\}$ where the index i indicates the order, or position, of the pixel within the signal. The pixel intensity value, or symbol $z_i$, associated with pixel i may be any one of the symbols in alphabet A. For common encodings of multi-level images, the symbols in A, $\{a_1, a_2, a_3, \ldots a_n\}$, are the unsigned, single byte values $0, 1, \ldots, 255$. In each of several passes, the DUDE-CTI considers each symbol within a signal with respect to the symbol's context. The context 406 shown in FIG. 4A for a currently considered pixel, or central symbol, 408 comprises the pixel values contained in a 5×5 square region surrounding the currently considered pixel 408, but not including the currently considered pixel. In other words, the context for symbol 408 comprises the values of the 24 nearest symbol neighbors within the image signal containing currently considered symbol 408. In the discussion of the DUDE-CTI denoiser, the currently considered symbol, such as symbol 408 in FIG. 4A, is referred to as the "central symbol" of the context surrounding the symbol, but the context is not considered to include the central symbol.

Many different context shapes and sizes are possible. FIG. 4B shows an alternative 24-symbol context for an image signal. In general, the useful information content per symbol of a context may increase with increasing size up to a context size of maximum useful information per symbol, and then decrease with context sizes greater than the context size of maximum useful information per symbol. Analysis and denoising of noisy signals involves frequent context-based computations, with execution times increasing with increases in the context size employed in the analysis. Therefore, efficiency constraints may constrain context sizes to sizes, in symbols, below the maximum useful information per symbol size. Moreover, the maximum useful information per symbol context size may vary with the image signals being denoised.

Figure 5A:
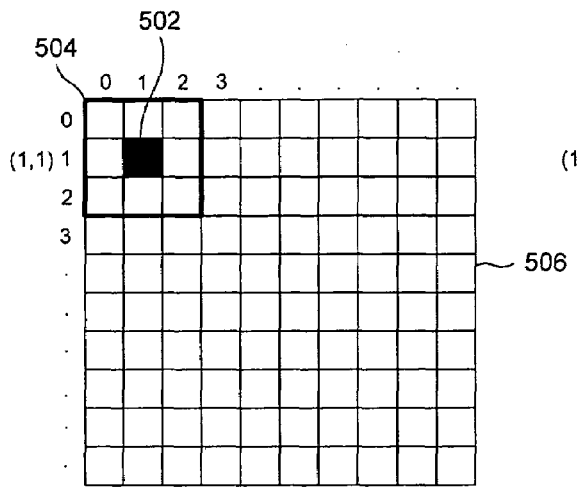
FIGS. 5A-D illustrate context usage during analysis and denoising of noisy signals.
Figure 5B:
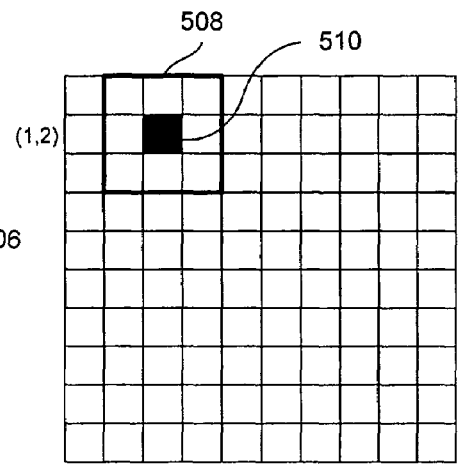
Figure 5C:
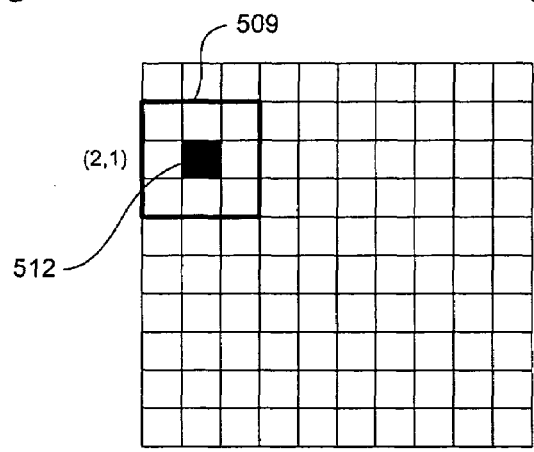
Figure 5D:
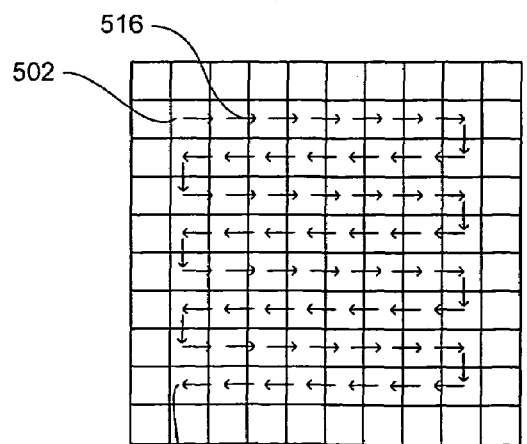

FIGS. 5A-D illustrate context usage during analysis and denoising of noisy signals. In FIG. 5A, the uppermost and leftmost symbol 502 with a full, 3×3 symbol context 504 within a small, square image 506 is shown. In certain types of analysis and denoising, special contexts are used for edge symbols, such as the first and last symbols of each row and column of the image. In other techniques, including the technique illustrated in FIGS. 5A-D, only symbols with full contexts are analyzed. FIGS. 5B and 5C show the 3×3 contexts 508 and 509 around the next rightmost symbol 510 and the next lowest symbol 512 with respect to symbol 502 in FIG. 5A. As shown in FIG. 5D, a given pass, or stage, of analysis or denoising may involve successive consideration of each full-context symbol within an image signal, starting with a first symbol 502 and proceeding to a final symbol 514. In FIG. 5D, small arrows, such as arrow 516, indicate each step of a pass in which each symbol is considered. In alternate techniques, all of the symbols within a signal may be considered, with specialized asymmetrical contexts employed for those symbols lacking a full context, or neighborhood.

Images are generally 2-dimensional data sets, and analysis and denoising methods for images therefore frequently use 2-dimensional contexts symmetrically disposed with respect to the central symbol. In other types of data sets, other types of contexts may be appropriate. For example, in digitally encoded text files, comprising essentially a one-dimensional series of symbols, a single length of symbols that include the central symbol may be employed as a context. Other types of signals may profitably employ more complex, non-contiguous or hyperdimensional contexts.

Figure 6:
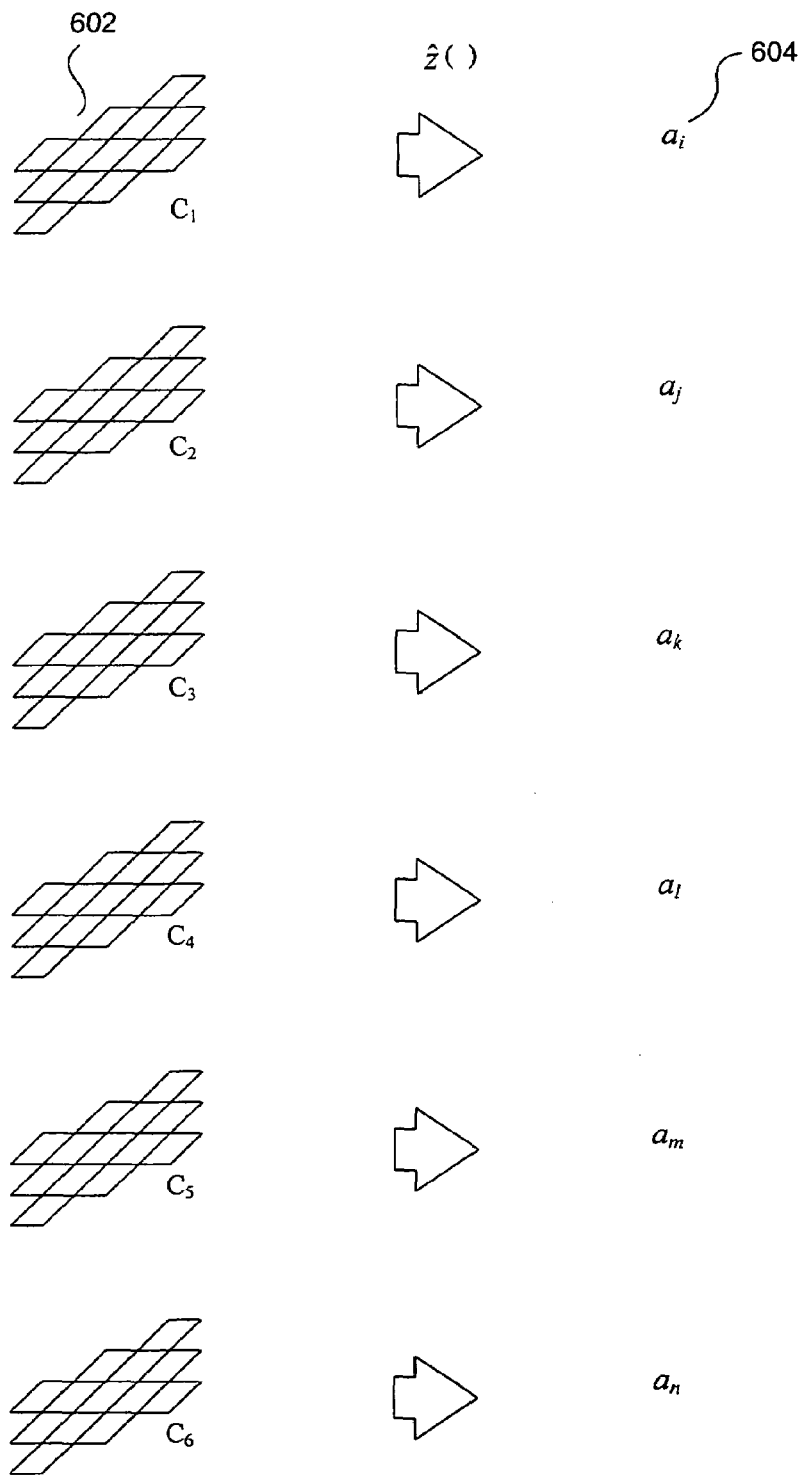
FIG. 6 illustrates the predictor function $\hat{z}(\ )$.

The DUDE-CTI method employs a central-symbol predictor function $\hat{z}()$. FIG. 6 illustrates the predictor function $\hat{z}()$.

As illustrated in FIG. 6, the $\hat{z}(\ )$ function receives, as a sole argument, a context, such as context $C_1$ 602 in FIG. 6, from a noisy signal and returns a symbol 604 predicted to be the central noisy symbol. In other words, as shown in FIG. 6, for each possible context $C_1, C_2, C_3, \ldots$ that may occur in a noisy signal, the predictor functions $\hat{z}(\ )$ returns a corresponding central symbol for the context.

Figure 7:
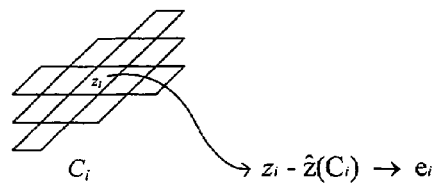
FIG. 7 illustrates computation of an error $e_i$ for a symbol $z_i$ observed within a context $C_i$ in noisy signal.

The DUDE-CTI method computes an error $e_i$ for each symbol $z_i$ in the noisy signal as the difference between the observed symbol $z_i$ and the symbol predicted by the predictor function $\hat{z}(\ )$ for the context $C_i$ for the symbol $z_i$. FIG. 7 illustrates computation of an error $e_i$ for a symbol $z_i$ observed within a context $C_i$ observed in a noisy signal.

Figure 8:
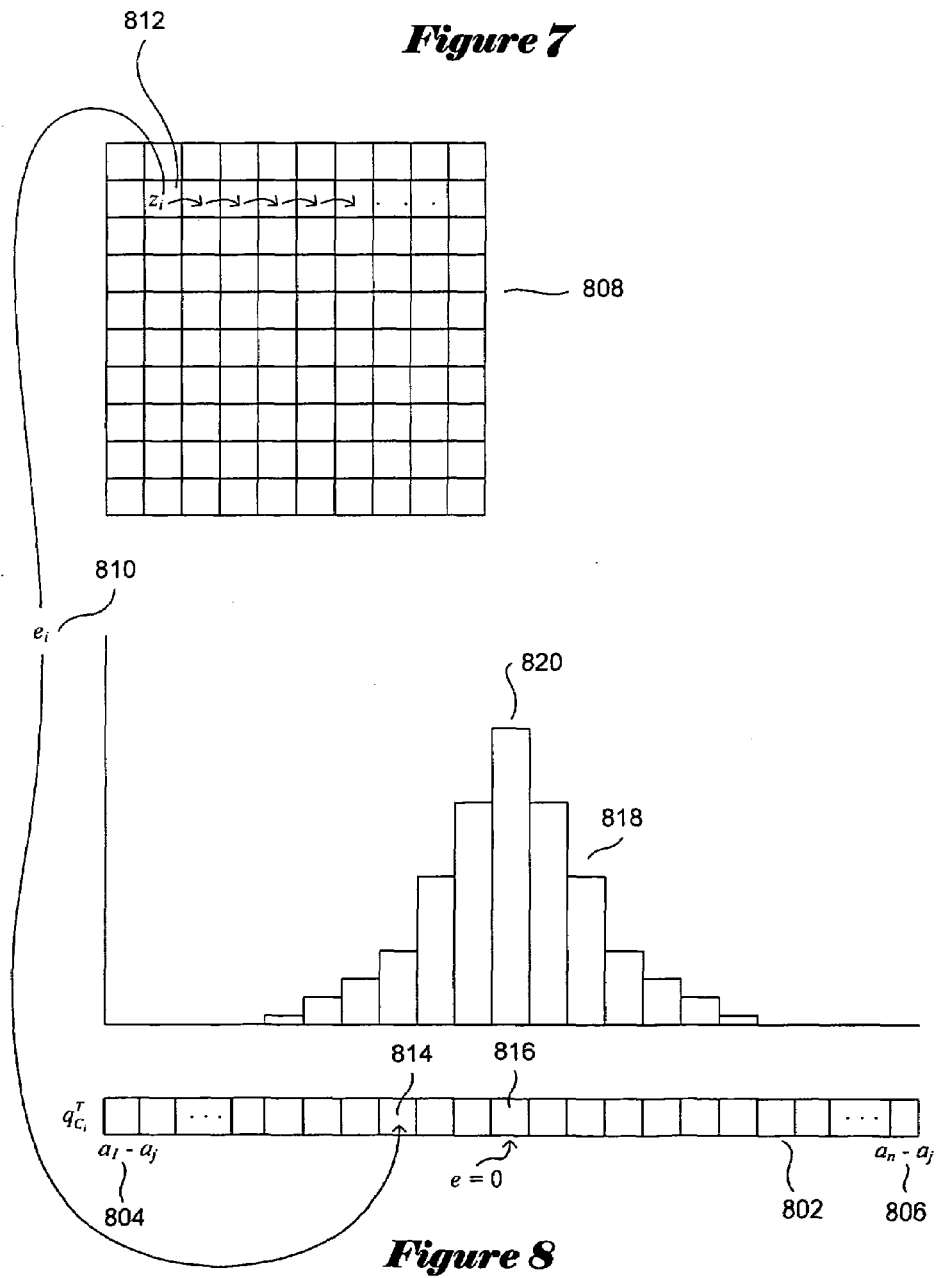
FIG. 8 illustrates accumulation of error information for a particular context during analysis of a noisy image signal.

FIG. 8 illustrates accumulation of error information for a particular context during analysis of a noisy image signal. The error-information accumulation in FIG. 8 is context specific. As discussed later, more efficient DUDE-CTI implementations use cluster-specific error-information accumulation. As shown in FIG. 8, a data structure, or vector, $q_{C_i}^T$ 802 is maintained for each possible context $C_i$ in order to count the occurrences of different possible error values computed for the context $C_i$ during analysis of a noisy image signal. If the predictor function $\hat{z}(C_i)$ predicts the symbol $a_j$ for context $C_i$, then, according to the error equation $e_i=z_i-\hat{z}(C_i)$, the error values that can be computed for context $C_i$ range from $a_1$-$a_j$ 804 to $a_n$-$a_j$ 806.

In a first pass of the DUDE-CTI denoiser, each symbol in a noisy image signal 808 is considered, and the error for each considered symbol is tabulated in the appropriate vector $q_C^T$ for that symbol. For example, in FIG. 8, an error $e_i$ 810 is computed from the first considered symbol $z_i$ 812 and associated context $C_i$, and the computed error $e_i$ is used to compute the position of a counter 814 within the vector $q_{C_i}^T$ 802 that is updated to reflect the occurrence of error $e_i$ in the noisy image signal 808. The computed error $e_i$ 810 can be viewed as being offset from a counter 816 within the vector $q_{C_i}^T$ 802 corresponding to a computed error of 0. As each symbol is considered during the first pass of the DUDE-CTI method, the vector $q_C^T$ corresponding to the observed context of the symbol is updated to reflect the occurrence of the error e computed from the symbol and context observed for the symbol within the noisy image signal. After the first pass of the DUDE-CTI method, each vector $q_C^T$ generally stores a histogram more or less symmetrically disposed about the counter within the vector $q_C^T$ corresponding to a computed error value e of 0. For example, in FIG. 8, the contents of the counters within vector $q_{C_i}^T$ 802 are plotted above the vector $q_{C_i}^T$ in a two-dimensional plot 818, and form a histogram with a central, highest peak 820 corresponding to the counter 816 within vector $q_{C_i}^T$ 802 representing a computed error of 0. In other words, the symbol predicted by the predictor function $\hat{z}(\ )$ for a given context $C_i$ is generally the symbol most often observed within the context $C_i$ in the noisy signal. Thus, following the first pass of the DUDE-CTI denoiser method, histograms of observed errors for each context are collected.

Unfortunately, when contexts of even modest size are used, a typical image will not contain a sufficient number of occurrences of each context to collect reliable, well-formed histograms of error occurrences, such as the histogram shown in FIG. 8. For this reason, the DUDE-CTI method employs context clustering in order to collect sufficient numbers of error occurrences for each context.

Figure 9:
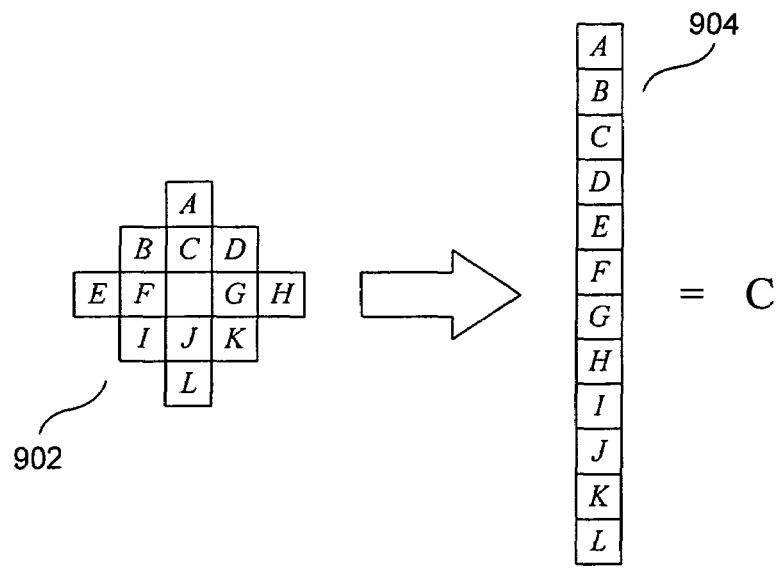
FIG. 9 illustrates a context vector.

FIG. 9 illustrates a context vector. It is convenient to consider context vectors for the mathematical steps of the DUDE-CTI method. As shown in FIG. 9, the symbols that occur within a context 902 may be linearly ordered into a vector 904 according to some linear ordering method that is uniformly applied to all contexts. In FIG. 9, symbols A-L from 2-dimensional context 902 are re-ordered into a column vector 904 by a left-to-right, top-down traversal of the 2-dimensional context 902. The linear ordering method is arbitrary, and different linear ordering methods may be mathematically or programmatically convenient for different types of contexts. A context vector may be considered to be a row vector or a column vector, depending on conventions chosen for the analysis using the context vector. In other words, the convention is arbitrary.

Figure 10:
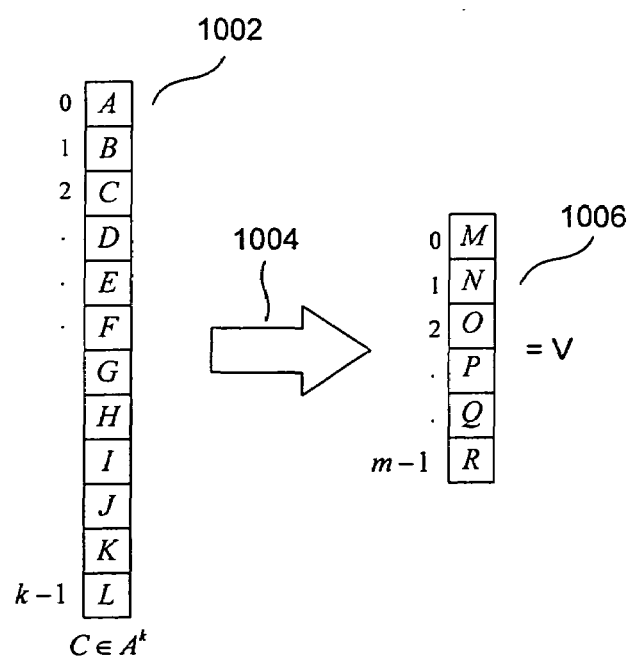
FIG. 10 illustrates a context-vector to cluster-index mapping.

Context clustering can be thought of as a many-to-one mapping, or binning, of context vectors in a context-vector space into a set of context-cluster indices. FIG. 10 illustrates a context-vector to cluster-index mapping. In FIG. 10, a context vector 1002 $C \in A^k$ of dimension k is mathematically transformed 1004 to a cluster index V 1006 with a range of values expressible using a sequence of m symbols over some alphabet (e.g. binary), where m is less than the dimension k of the context vector.

Figure 11:
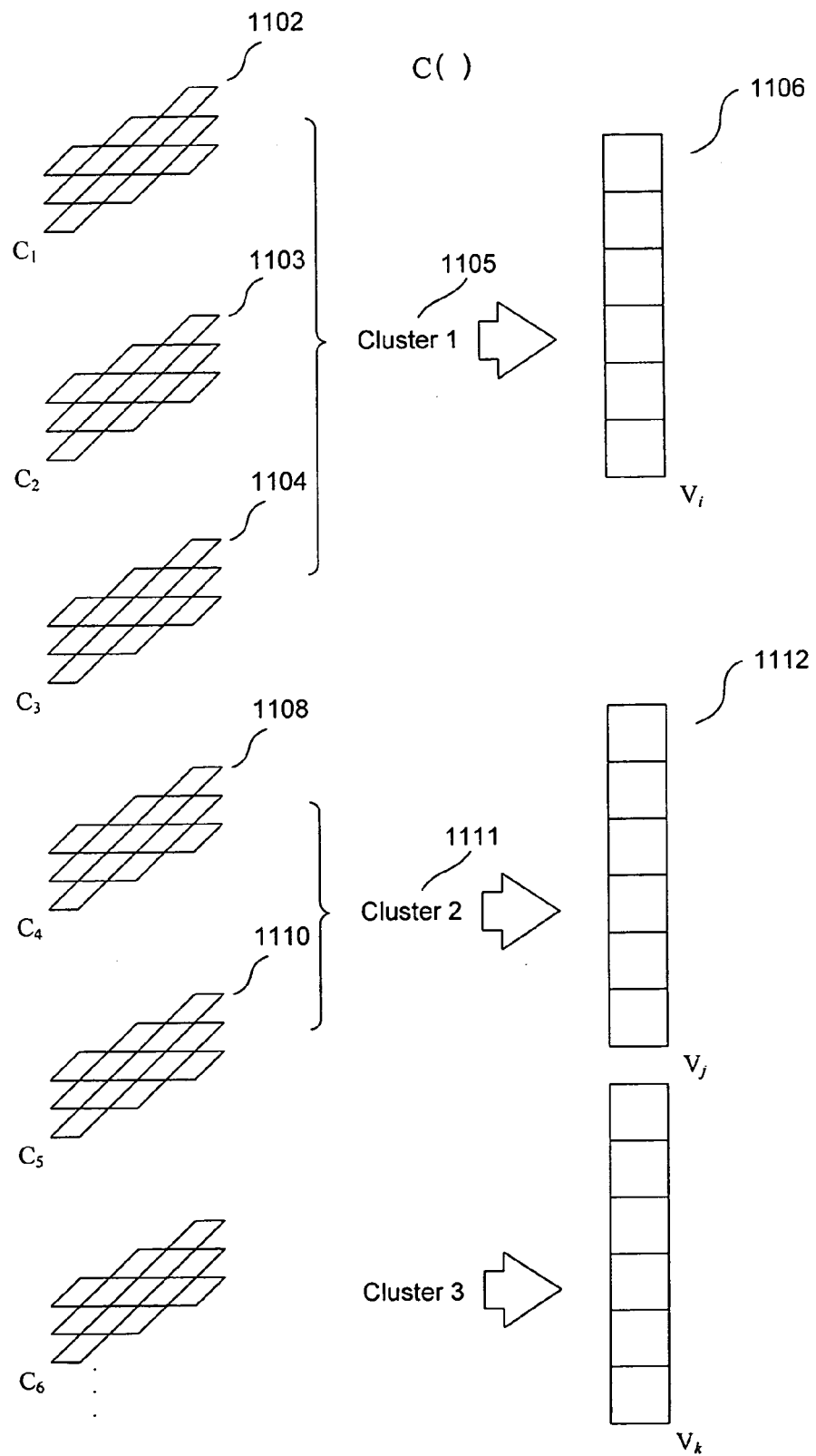
FIG. 11 illustrates a context-clustering function $C(\ )$ used by various embodiments of the DUDE-CTI denoising algorithm.

FIG. 11 illustrates a context-clustering function $C(\ )$ used by various embodiments of the DUDE-CTI denoising method. As shown in FIG. 11, the context-clustering function $C(\ )$ maps a given context, supplied as a sole argument, that is expected to produce a particular type of error histogram to a particular cluster to which other contexts that are expected to produce similar error histograms may be mapped. The context is, in turn, mapped to a cluster index. Multiple contexts are generally mapped to any given cluster by the context-clustering function $C(\ )$. For example, in FIG. 11, three contexts 1102-1104 are mapped by the context-clustering function $C(\ )$ to Cluster 1 1105, in turn mapped to, or associated with, cluster index $V_i$ 1106. Similarly, contexts 1108 and 1110 are both mapped by the context-clustering function $C(\ )$ to Cluster 2 1111, in turn mapped to, or associated with, cluster index $V_j$ 1112. The number of contexts mapped to any particular cluster may vary, depending on the context-clustering function $C(\ )$. Any particular DUDE-CTI embodiment may use any of a number of different context-clustering functions, although suitable context-clustering functions generally have the property of mapping contexts expected to produce similarly shaped error histograms, such as the error histogram shown in FIG. 8, to a common cluster. In other words, all the contexts mapped to any particular cluster by a suitable context-clustering function would produce similarly shaped error histograms were the first pass of the DUDE-CTI method executed on a sufficiently large noisy image signal to collect sufficient occurrence counts of errors for each context to generate well-formed histograms for each context.

Figure 12:
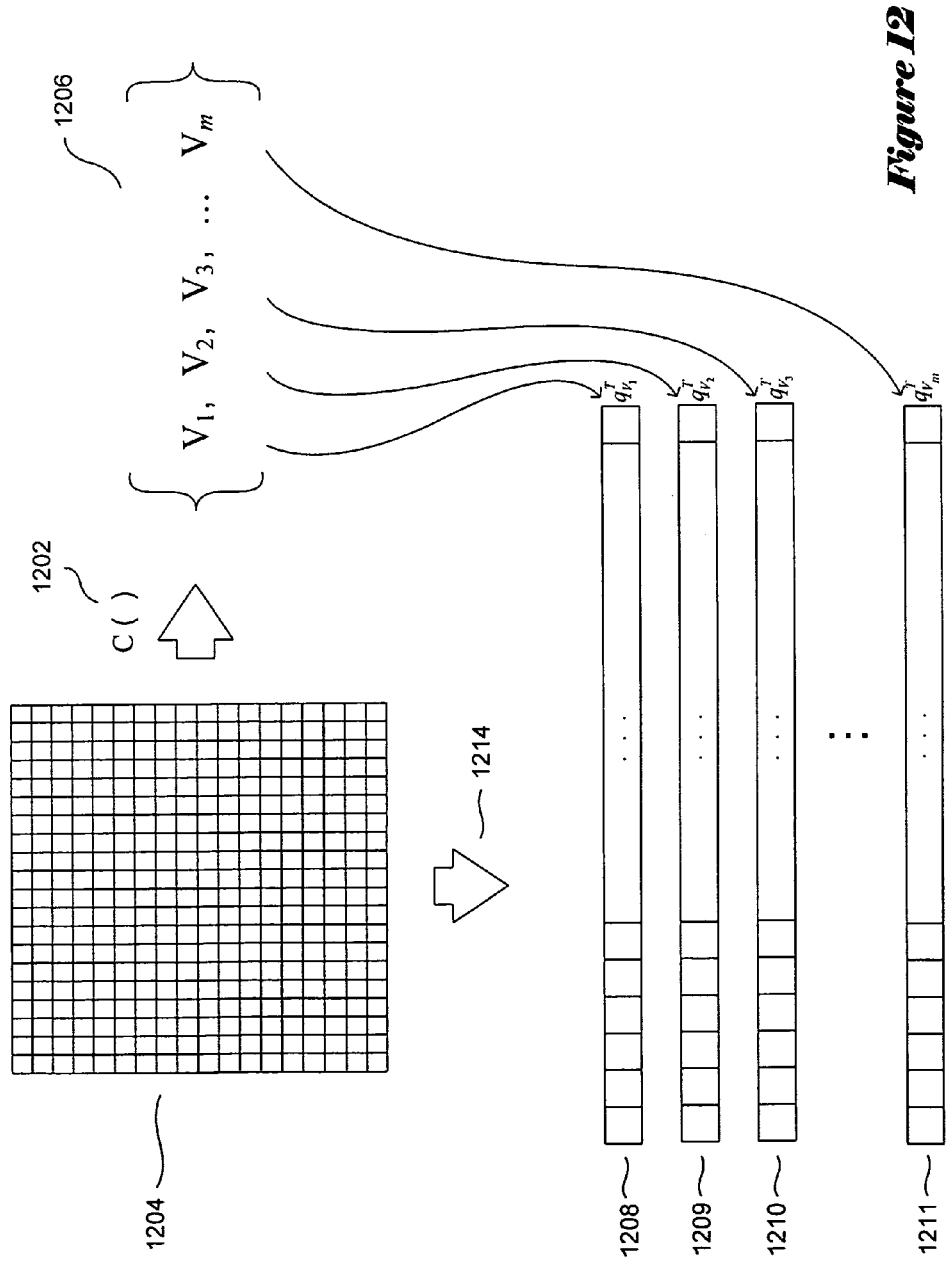
FIG. 12 illustrates the use of clustering by the DUDE-CTI algorithm during a first pass, in which error histograms are prepared.

FIG. 12 illustrates the use of clustering by the DUDE-CTI method during a first pass, in which error histograms are prepared. As shown in FIG. 12, a context-clustering function $C(\ )$ 1202 is employed to map contexts occurring within a noisy image signal 1204 to a set of clusters 1206. Then, an occurrence-count vector $q_{V_i}^T$ 1208-1211 is instantiated and initialized for each possible cluster $V_i$. Finally, each symbol in the noisy image signal 1204 is analyzed 1214 in the first pass to compute and tabulate the occurrence of computed errors, on a cluster-by-cluster basis. The errors are computed as discussed above, with reference to FIGS. 7 and 8, except that all errors observed for all contexts that belong to a given cluster $V_i$ are commonly tabulated together in the vector $q_{V_i}^T$ for that cluster, rather than being separately tabulated in context-associated vectors $q_C^T$, as was done in FIG. 8. Thus, clustering allows a much larger number of error occurrences to be tabulated together in each histogram generated during analysis of a given noisy image signal. However, common tabulation of error occurrences in cluster-associated vectors $q_{V_j}^T$ is only meaningful if the shapes of the error histograms that would be separately produced for all contexts associated with the cluster are similar.

Figure 13:
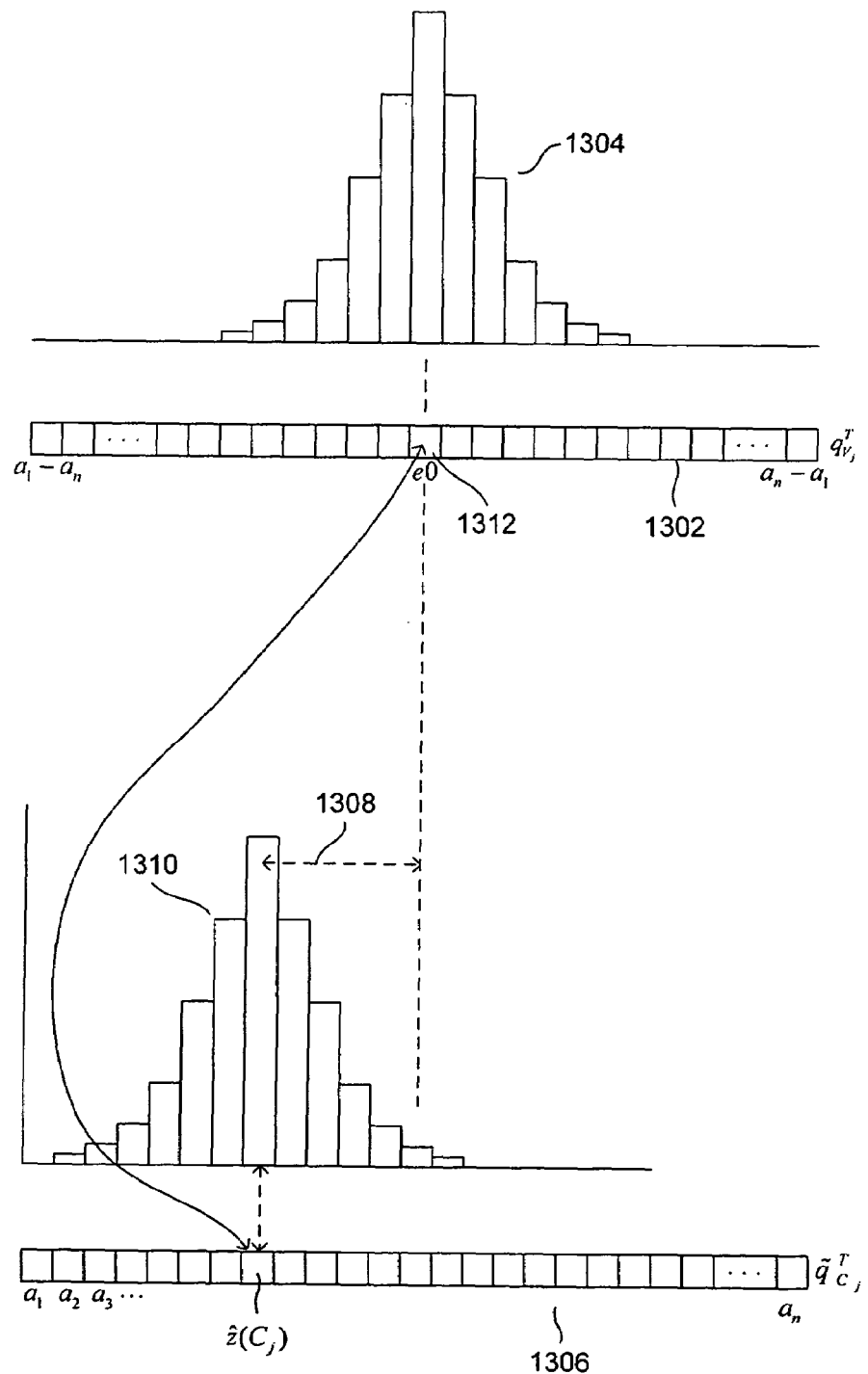
FIG. 13 illustrates generation of context-specific symbol-occurrence probability distributions $q_C^T$ from cluster-associated error-occurrence vectors $q_v^T$ collected during the first pass of a cluster-based DUDE-CTI algorithm.

FIG. 13 illustrates generation of context-specific symbol-occurrence probability distributions $\tilde{q}_{C_j}^T$ from cluster-associated error-occurrence vectors $q_{V_j}^T$ collected during the first pass of a cluster-based DUDE-CTI method. In FIG. 13, a cluster-associated error-occurrence vector $q_{V_j}^T$ 1302 is shown at the top of the diagram, along with a histogram plot 1304 of the values stored in the counters within the cluster-associated vector $q_{V_j}^T$, using the illustration convention employed in FIG. 8. A context-specific symbol-occurrence probability distribution $\tilde{q}_{C_j}^T$ for a context $C_j$ associated with cluster $V_j$ 1304 is generated in FIG. 13 by copying the contents of the cluster-associated error-occurrence vector $q_{V_j}^T$ 1302 into the counters of context-associated context-specific symbol-occurrence probability distribution $\tilde{q}_{C_j}^T$. However, rather than copying the error-occurrence counts from cluster-associated vector $q_{V_j}^T$ into corresponding counters of context-associated context-specific symbol-occurrence probability distribution $\tilde{q}_{C_j}^T$, each copy involves an offset 1308, so that the context-specific probability distribution 1310 is centered about the symbol value $\tilde{z}(C_j)$ predicted by the predictor function for the context, rather than centered at the position 1312 corresponding to a computed error of 0 in the cluster-specific histogram 1304. In other words, the final, context-specific vector $\tilde{q}_{C_j}^T$ represents a probability distribution for the occurrences of symbols $a_1, a_2 \ldots a_n$ from the alphabet A for all occurrences of the context $C_j$ in the noisy image signal, estimated from the probability distribution observed for the cluster to which the context is mapped by the context-clustering function C( ). The copy operation may therefore be accompanied by a normalization, to provide a normalized, estimated probability distribution, and a domain-related adjustment, since the domain of $q_{V_j}^T$ is generally twice as large as the symbol alphabet size n, which is the domain of $\tilde{q}_{C_j}^T$. Thus, the error-occurrence counts tabulated in common for each cluster are used to generate specific symbol-occurrence probability distributions $\tilde{q}_{C_j}^T$ for each context $C_j$.

Next, the DUDE-CTI denoiser generates a function g(C, z) that computes a replacement symbol $\hat{x}$ for a given central symbol z that occurs within context C observed in the noisy image signal. The replacement function g( ) can then be used in a second, symbol-by-symbol pass, to replace each symbol in the noisy image signal with a corresponding replacement symbol. The symbol replacement for each symbol in the noisy image signal is carried out independently. In other words, the contexts applied to the replacement function g( ) are the contexts observed in the noisy image signal, rather than partially symbol-replaced contexts. It should be noted that, in many cases, the replacement symbol $\hat{x}$ is identical to the corresponding observed symbol z in the noisy image signal.

Computation of the replacement function g( ) involves use of two matrices: (1) a matrix Π that represents a channel-noise model for the noise-inducing channel that generates symbol differences between the initial, clean image signal and the noisy image signal; and (2) a distortion matrix Λ that represents the distortions in a recovered image produced by substituting for symbol $a_i$ in the corresponding clean image signal any of the symbols $a_1, a_2 \ldots a_n$, in alphabet A.

Figure 14:
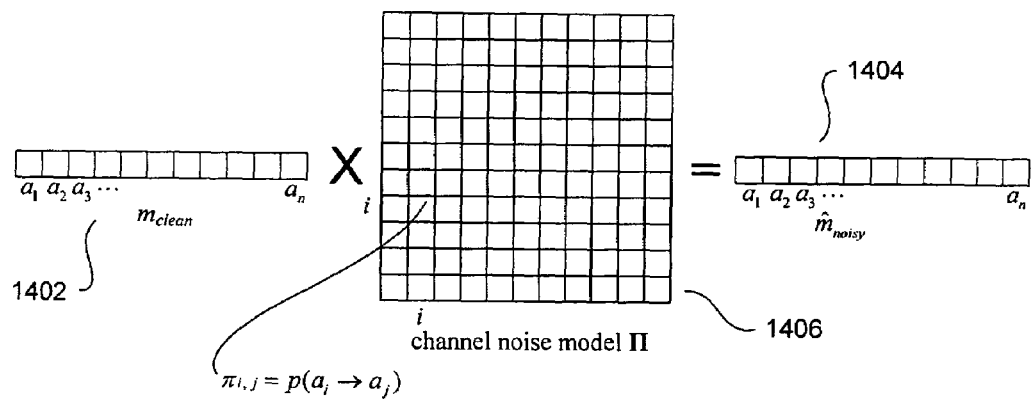
FIG. 14 illustrates a channel-noise-model matrix $\Pi$.

FIG. 14 illustrates a channel-noise-model matrix Π. In FIG. 14, the row vector $m_{clean}$ 1402 contains counts of the occurrences of each symbol in alphabet A within the clean, original image signal. The row vector $m_{clean}$ is indexed by symbols from the alphabet A, $a_1, a_2, a_3, \ldots$ A corresponding row vector $m_{noisy}$ contains the counts of occurrences of the symbols of the alphabet A in the noisy image signal. Multiplication of the row vector $m_{clean}$ by the channel-noise-model matrix Π 1406 produces a derived row vector $\hat{m}_{noisy}$ 1404. Each element $\pi_{ij}$ of the channel-noise-model matrix Π contains the probability of the transition of the symbol $a_i$ to the symbol $a_j$ as the clean signal passes through the noisy channel modeled by the channel-noise-model matrix Π. In mathematical terms:

$$m_{clean}\Pi = \hat{m}_{noisy}$$

$$\hat{m}_{noisy}[i] = m_{clean}[1]p(a_1 \to a_i) + m_{clean}[2]p(a_2 \to a_i) + \ldots + m_{clean}[n]p(a_n \to a_i)$$

The derived vector $\hat{m}_{noisy}$ 1404 is expected to be fairly close, relative to the signal size, to the vector $m_{noisy}$ containing counts of symbols observed in a noisy signal. Provided that the channel-noise-model matrix Π is invertible, or an approximate or pseudo inverse of the matrix Π can be obtained by any of a number of matrix inversion methods, an observed vector $m_{noisy}$ including the counts of occurrences of symbols observed in a noisy signal can be multiplied by the inverse of the channel-noise-model matrix Π to produce approximate estimates of the probabilities of occurrences of symbols in the clean signal:

$$m_{clean} \cong m_{noisy} \Pi^{-1}$$

This approximation technique can be extended to vectors $\tilde{q}_{C_j}^T$ that include the derived probabilities of occurrences of symbols of the alphabet A observed in contexts $C_j$ in the noisy signal to produce estimates of probabilities of occurrence of symbols in the alphabet A in the clean signal corresponding to occurrences of the context $C_j$ in the noisy signal by multiplication of $\tilde{q}_{C_j}^T$ by the inverse of the channel-noise-model matrix Π, as follows:

$$\tilde{q}_{clean,C_j}^T \cong \tilde{q}_{C_j}^T \Pi^{-1}$$

Figure 15:
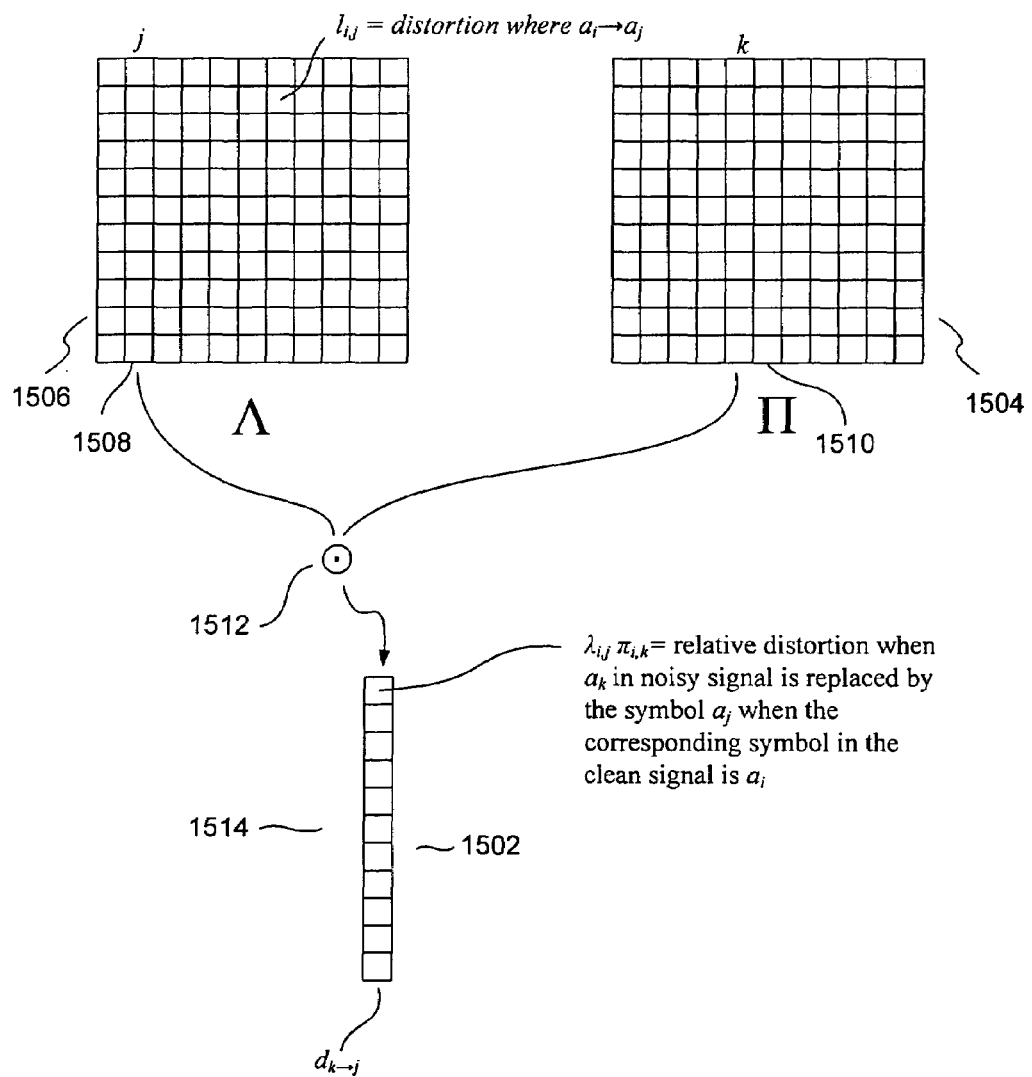
FIG. 15 illustrates construction of a relative distortion vector for replacement of a symbol $a_k$ in a noisy signal by a symbol $a_j$.

FIG. 15 illustrates construction of a relative distortion vector that numerically expresses the distortion expected from replacement of a symbol $a_k$ in a noisy signal by a symbol $a_j$. Construction of a relative distortion vector 1502 involves a column of the channel-noise-model matrix Π 1504, discussed above with reference to FIG. 14, as well as a column from the distortion matrix Λ 1506. Each element $\lambda_{ij}$ in the distortion matrix Λ contains a numerical estimate of the distortion produced in an image when the symbol $a_i$ in the clean signal is replaced by the symbol $a_j$ in the noisy signal. When a column j 1508 is selected from the distortion matrix Λ and a column k is selected from the channel-noise-model matrix Π 1510, and the selected columns $\lambda_j$ and $\pi_k$ are combined by the Schur product operation 1512, the distortion vector $d_{k \to j}$ 1514 is produced. The Schur product is carried out by the multiplication of each element in the column $\lambda_j$ by the corresponding element in the $\pi_k$ column. Each element of the distortion vector $d_{k \to j}$, $\lambda_{ij}\pi_{i,k}$, includes a numerical estimate of the relative distortion produced when symbol $a_k$ in a noisy signal is replaced by the symbol $a_j$ when the corresponding symbol in the clean signal is $a_i$.

FIG. 16 illustrates the computation of an estimate of the distortion produced by replacing symbol $a_k$ within context C in a noisy signal by the replacement symbol $a_j$. This distortion value is obtained by the inner product of the row vector $\tilde{q}_{clean,C}^T$ 1602 by the distortion column vector $d_{k \to j}$ 1604. Note that the row vector $\tilde{q}_{clean,C}^T$ is obtained, as discussed above, by multiplying the derived row vector $\tilde{q}_C^T$ by the inverse of the channel-noise-model matrix Π. Therefore, as shown in FIG. 16, a numerical estimate of the distortion produced by replacing the symbol $a_k$ within context C in a noisy signal by the symbol $a_j$ can be obtained entirely from the derived symbol occurrence frequencies within the noisy signal, the distortion matrix $\Lambda$, and the channel-noise-model matrix $\Pi$ and its inverse $\Pi^{-1}$.

FIG. 17 illustrates a symbol-replacement function g(C,z). The symbol-replacement function g(C,z) computes a replacement symbol for an observed central symbol z within an observed context C. The observed central symbol and context are supplied as arguments to the symbol-replacement function g(C,z). The function g( ) considers each possible replacement symbol value for the central symbol of the context C and returns the estimated minimally distorting replacement character $\hat{x}$, where, for a given observed central symbol z within an observed context C:

$$\hat{x} = g(C, z) = \underset{j = 1 \text{ to } n}{\operatorname{argmin}} (\hat{d}_{z \rightarrow a_j})$$

where, for $z = a_i$, $\hat{d}_{z \rightarrow a_j} = \hat{d}_{a_i \rightarrow a_j} = \tilde{q}_{clean,C}^T \cdot d_{i \rightarrow j}$ Thus, the symbol-replacement function g( ) produces a replacement character $\hat{x}$ for an observed central symbol z within a context C observed in the noisy signal.

Embodiments of the Present Invention

Figure 18A:
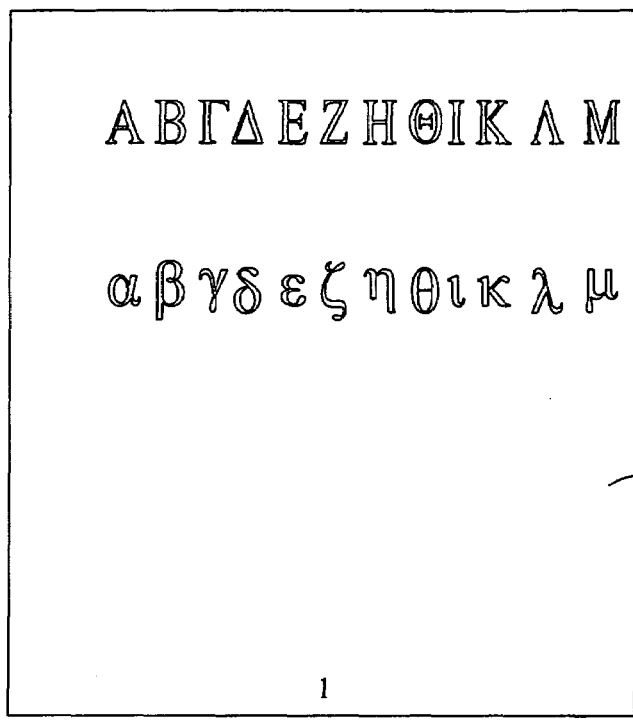
FIGS. 18A-D illustrate the problem of bleed-through noise in double-sided printed documents.
Figure 18B:
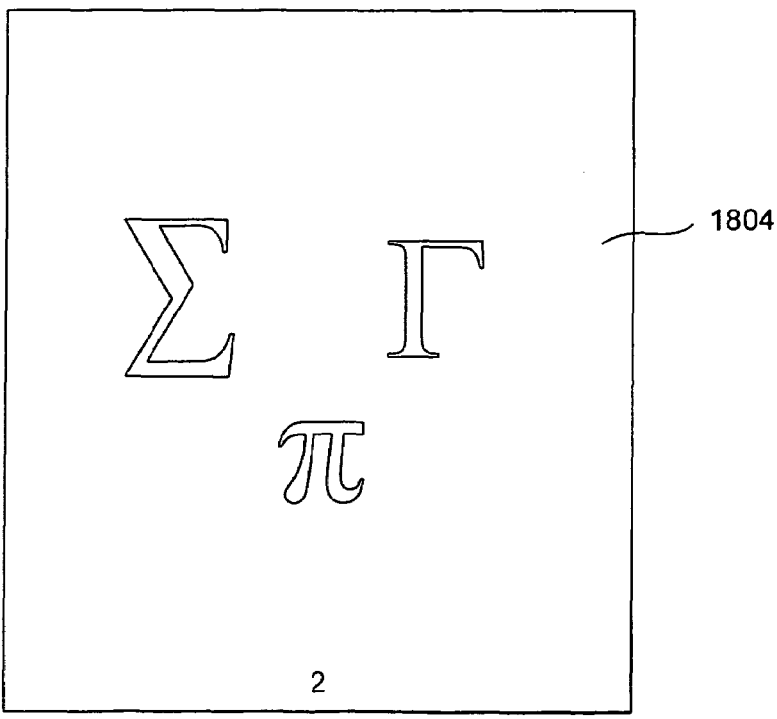

FIGS. 18A-D illustrate the problem of bleed-through noise in double-sided printed documents. FIG. 18A shows a first side of a page 1802 of a double-sided printed document, and FIG. 18B shows the opposite side 1804 of the page of the printed document. In an ideal situation, although the first side 1802 and the second side 1804 of the page are separated from one another only by the relatively thin paper or polymer substrate of the page, information printed on the second side of the page 1804 is not visible when viewing the first side 1802 of the page, and information on the first side of the page 1802 is not visible when viewing the second side of the page 1804.

Unfortunately, the thin paper or synthetic polymer substrate may often not serve as an ideal, fully opaque barrier to information printed on the two sides of a page. For example, when a page is illuminated by a relatively intense light during a scanning or copying process, the page material may be translucent, rather than opaque, resulting in information printed on the second side of a page appearing, as a mirror image of the information, in the scanned image of the first side of the page. Various physical changes to paper and other polymeric materials of the page may result in increased translucency of the substrate material, and a corresponding increase in bleed-through of information printed on a second side of a page into the scanned image of a first side of a page. For example, increased moisture content of a page often results in decreased opacity. Slow oxidation of the cellulose or synthetic polymers within a page, as the page ages, may also markedly change the opacity of a page. Ink used to print documents can physically bleed through the cellulose or synthetic-polymer substrate to interfere with printed information on the opposite side of a page, particularly in older documents printed by older printing technologies.

Figure 18C:
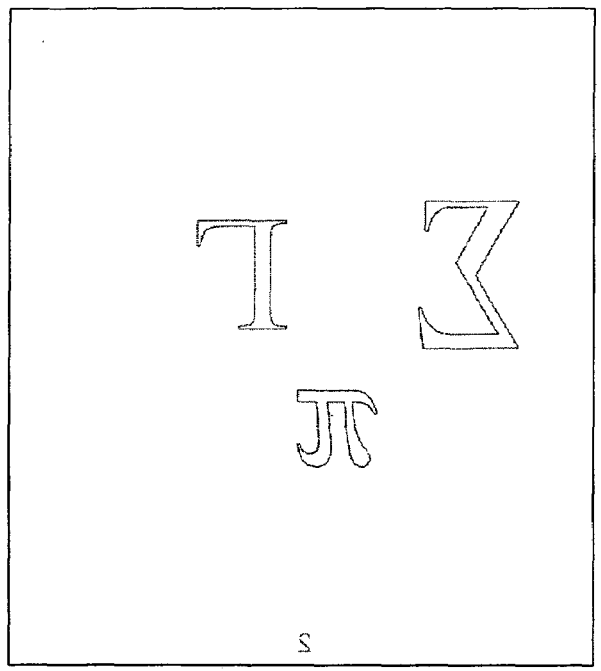

FIG. 18C shows the information printed on the second side 1804 of the first page of the example document transformed by a mirror symmetry operation. Information on the second side of the document appears as the mirror image of that information when viewed from the first side of the document.

Figure 18D:
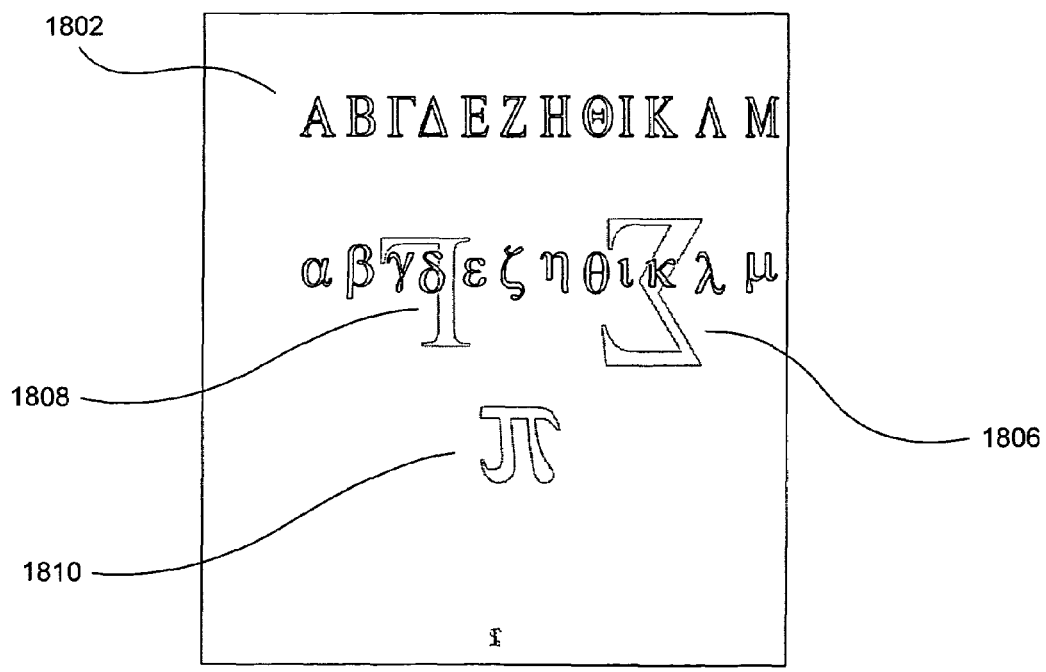

FIG. 18D shows bleed-through of the mirror-image of the information printed on the second side of the document 1804 into the image of the first side of the document. The mirror images of the sigma 1806, gamma 1808, and pi 1810 characters printed on the second side 1804 of the document appear together with the characters printed on the first side 1802 of the document, such as the capital alpha character 1812, due to one or more bleed-through processes.

Bleed-through noise is seen, in FIG. 18D, to be of a markedly different character than salt-and-pepper noise and Gaussian noise. While salt-and-pepper noise and Gaussian noise appear to be randomly distributed within an image, and generally do not dramatically degrade a human viewer's ability to recognize the original information within an image, bleed-through noise, being the mirror image of information printed on the opposite side of a page, contains information content that may significantly interfere with interpretation of the information on the viewed side of a page. Bleed-through noise is not randomly distributed within the image, but generally has long-range shape and form characteristic of printed information. Nonetheless, the DUDE-CTI approach to denoising digital representations of scanned images can be tuned to efficiently and effectively remove bleed-through noise, in addition to salt-and-pepper and Gaussian-like noise, from digital representations of scanned images.

Figure 19:
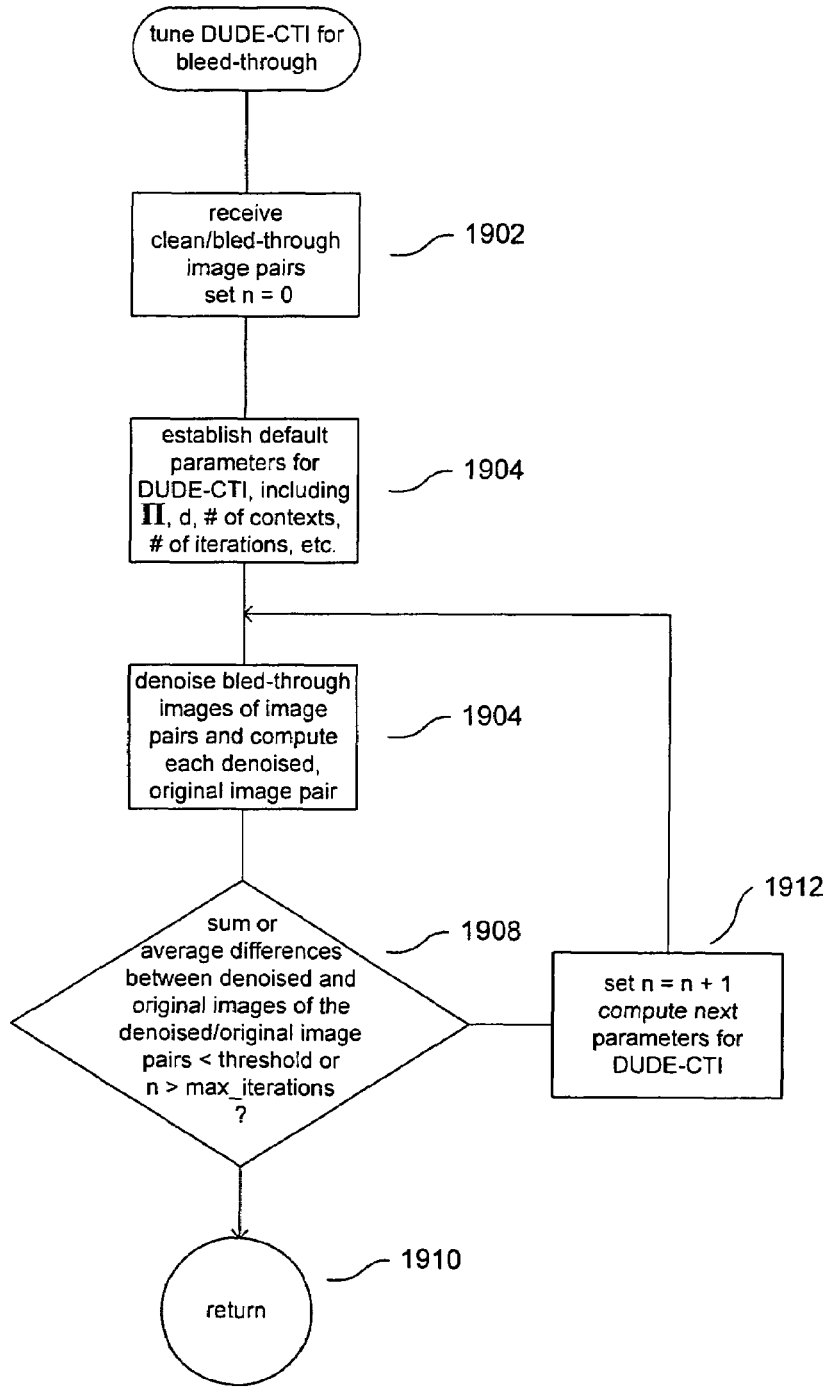
FIG. 19 is a control-flow diagram illustrating one approach to tuning the DUDE-CTI, or a system incorporating the DUDE-CTI, according to an embodiment of the present invention, in order to effectively and efficiently denoise digital representations of scanned images of double-sided documents in which the contribution of bleed-through noise to the observed noise is significant.

FIG. 19 is a control-flow diagram illustrating one approach to tuning the DUDE-CTI, or a system incorporating the DUDE-CTI, according to an embodiment of the present invention, in order to effectively and efficiently denoise digital representations of scanned images of double-sided documents in which the contribution of bleed-through noise to the observed noise is significant. First, in step 1902, a number of pairs of images are received, each pair consisting of a clean image and a corresponding, bled-through image produced by optical scanning or another image-acquisition process. In other words, unlike in a practical application, the clean images are, for tuning purposes, available for comparison purposes following denoising of the noisy, digital representations of the scanned images. In cases where the original clean image is not available, as, for example, in the case of antique books in which ink has bled through from the pages to which it was applied to the reverse sides of the pages, a good approximation for clean images can be obtained by manually removing interference, based on knowledge of the original, logical contents of the images. This can be done on a small subset of the documents or pages of interest, for the purposes of tuning the automatic denoising procedure. Also, in step 1902, an iteration variable n is set to 0.

In step 1904, the DUDE-CTI is configured with selected, default parameters. Many parameters of the DUDE-CTI are tunable, including the channel noise model $\Pi$, the distortion model, the number of contexts employed, the sizes and geometries of the contexts, the number of iterations in various DUDE-CTI iterative embodiments, in which a signal is iteratively denoised, and many other parameters. Next, in step 1906, the bled-through images of each image pair are denoised to produce a set of clean-image/denoised-image pairs. In step 1908, the clean image and denoised image of each pair of images are compared, and a sum or average of the differences between clean and corresponding denoised images is computed for the set of clean-image/denoised-image pairs. If the sum or average of the differences is below a threshold value, or if the number of iterations n is greater than a configurable maximum number of iterations for the tuning process, then tuning is complete 1910. Otherwise, in step 1912, the iteration variable n is incremented and a next set of parameters are computed and used to reconfigure the DUDE- CTI, to initiate another iteration of the denoising and comparison steps 1906 and 1908. The parameters may be computed according to a steepest descent or other type of optimization-trajectory computation, so that parameter adjustment converges quickly to an optimal set of parameter values. In other embodiments, the state space of parameters values may be exhaustively searched, or exhaustively searched at a relatively large granularity, and then refined. Many additional optimization and refinement strategies may be employed to compute the next set of parameters in step 1912. In one embodiment of the present invention, the elements of Π have values that correspond to Gaussian noise with a tunable variance parameter and the elements of Λ have values corresponding to squared error distortion. The contexts and associated predictors, quantization, and rough denoisers are initialized as in an embodiment of the DUDE-CTI described in the U.S. Patent Application "Content-based Denoiser that Simultaneously Updates Probabilities for Multiple Contexts" filed Jul. 12, 2005 and assigned to the Hewlett-Packard Company.

Figure 20:
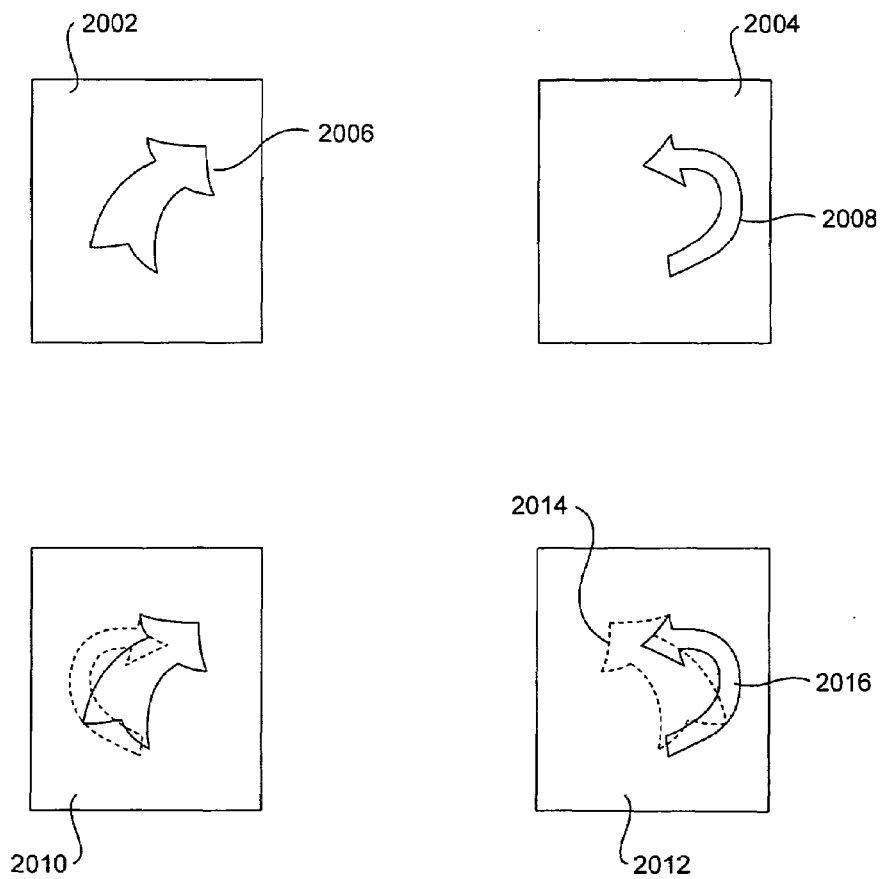
FIGS. 20-22 illustrate a combined-signal approach to employing a DUDE-CTI for denoising digital representations of scanned images of double-sided documents according to an embodiment of the present invention.
Figure 21:
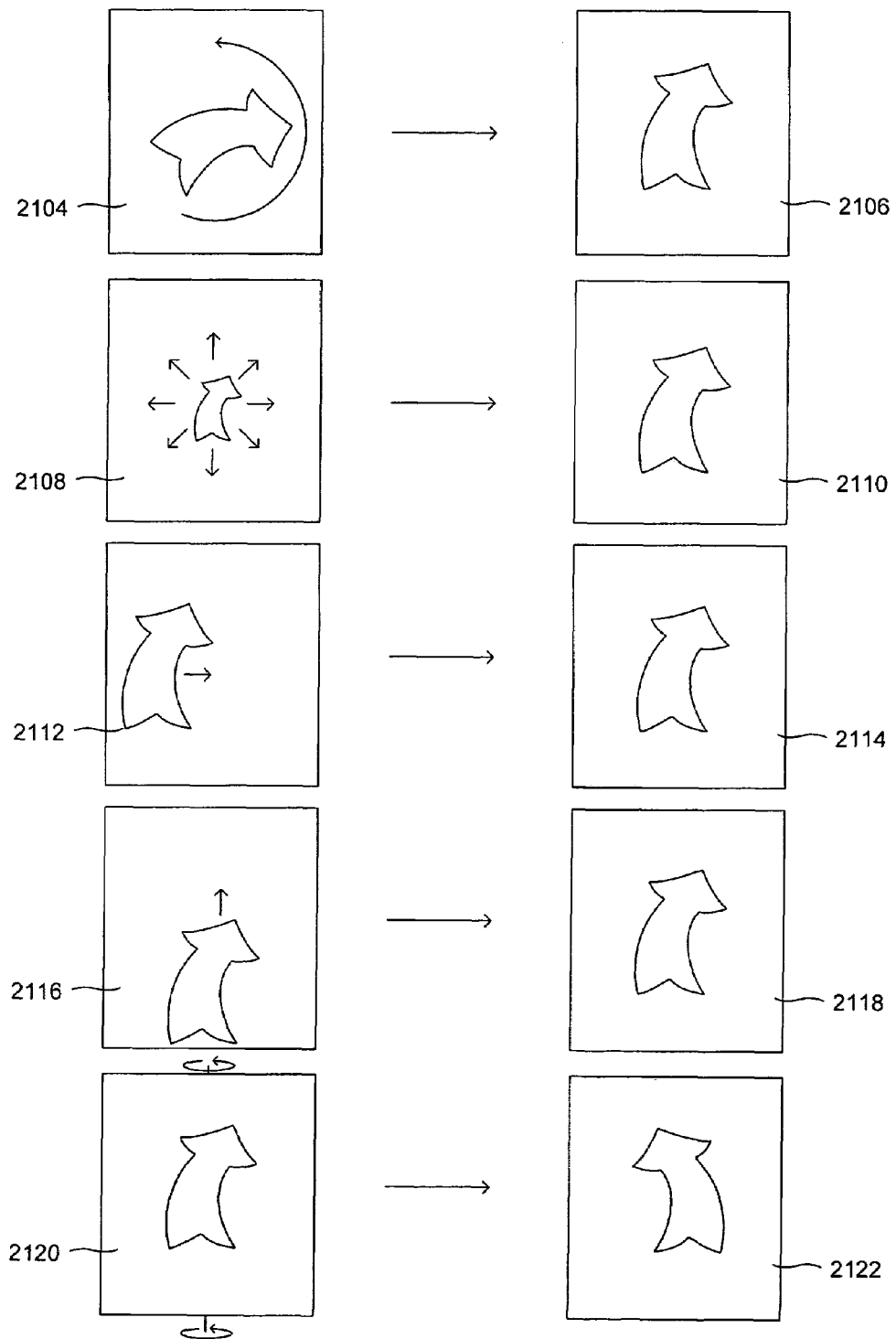
Figure 22:
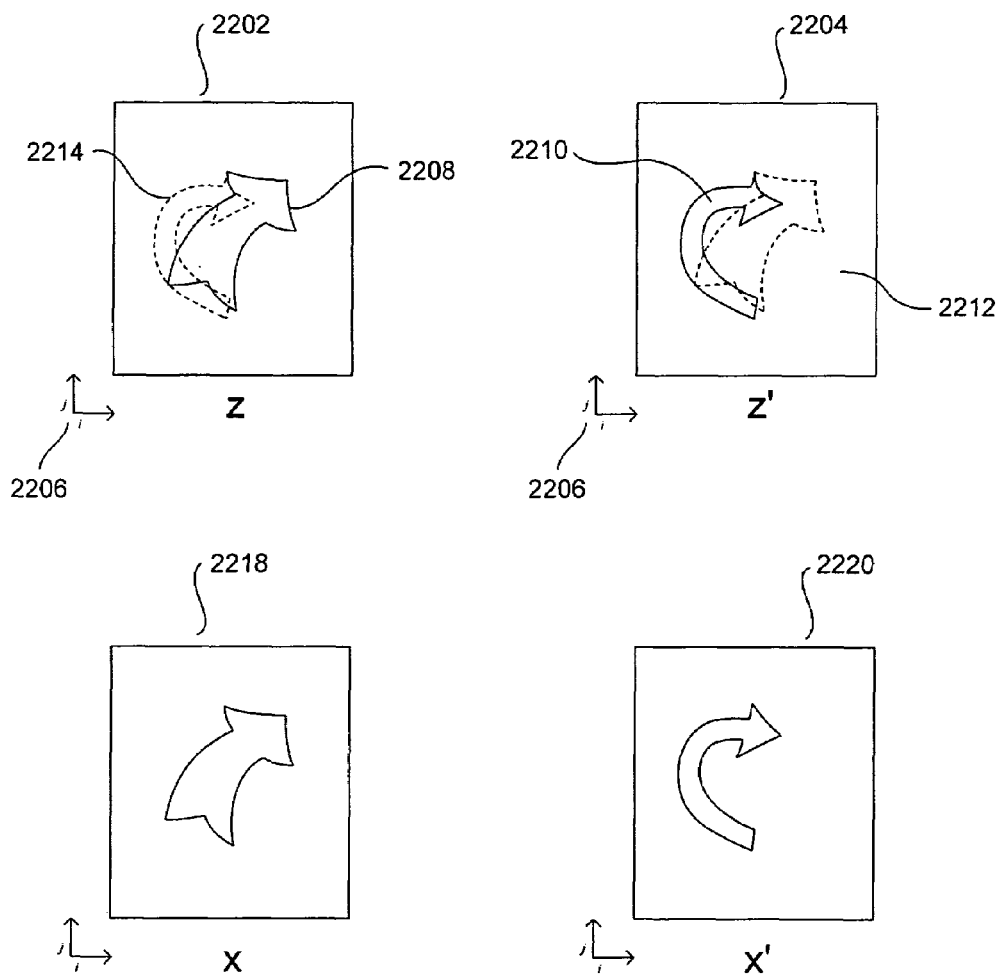

It has been found that the DUDE-CTI can be straightforwardly tuned to effectively denoise digital representations of scanned images that include the above-discussed types of random or pseudorandom noise as well as bleed-through noise. However, a second embodiment of the present invention that employs a combined signal consisting of the digital representations of the scanned images of both sides of a double-sided-document page can take advantage of redundant information contained in the combined signal to even more effectively and efficiently denoise digital representations of scanned images of double-sided printed documents. FIGS. 20-22 illustrate a combined-signal approach to employing a DUDE-CTI for denoising digital representations of scanned images of double-sided documents according to an embodiment of the present invention. FIG. 20 shows the ideal, clean images of a first side 2002 of a double-sided page and the second side 2004 of the double-sided page. The first side, for the purposes of illustration, includes a fat printed arrow 2006, and the second side 2004 contains a thinner printed arrow 2008. Scanned images of the first side 2010 and the second side 2012 are shown below the ideal images of the first side 2002 and the second side 2004. In the scanned image of the first side 2010, the thin arrow printed on the second side has bled through 2012 to interfere with the image of the fat arrow. Similarly, in the scanned image 2012 of the second side, the fat arrow has bled through 2014 from the first side to interfere with the image 2016 of the thin arrow. Because of variations and inconsistencies in the scanning process, the orientation of the combined images of the arrows in the scanned image of the first side 2010 is different from the orientation of the combined images of the arrows in the scanned image of the second side 2012. In general, variations and inconsistencies in the scanning process may lead to magnification, translation, rotation, and other alterations to the scanned image of the first side with respect to the scanned image of the second side.

In a first step in generating a combined signal consisting of the scanned images of each side of a double-sided page, the scanned images need to be aligned with one another. Alignment of the two scanned images is accomplished by application of one or more of the following operations, illustrated in FIG. 21: (1) rotation, in which the image is rotated with respect to a fixed, page-based coordinate system (2104 and 2106); (2) scaling, in which an image is enlarged or shrunk (2108 and 2110); (3) translation in a horizontal direction, in which an image is shifted along a horizontal axis (2112 and 2114); (4) translation in a vertical direction (2116 and 2118); and (5) a mirror operation, in which the mirror image of a scanned image is produced 2120 and 2122. Iterative application of combinations of these operations can be used to align the scanned image of the first side of a double-sided printed page with the scanned image of the second side of the double-sided printed page, so that both scanned images are aligned with a common, page-based, ij coordinate system. Several techniques exist in the art for performing these alignment operations. For example, well known techniques from the motion-compensation stage of current video compression schemes, including the MPEG compression standards, can be adapted for aligning scanned images of the first and second sides of double-sided printed pages in embodiments of the present invention. Following the alignment step, the scanned image of the first side of the double-sided document 2202 and the scanned image of the second side of the double-sided side document 2204 can be seen, in FIG. 22, to be aligned with a common coordinate system 2206. Once aligned, the coordinates of the positive, clean image of the fat arrow 2208 in the scanned image of the first side of the doubled-sided-document page 2202 are identical to the coordinates of the bled-through image of the fat arrow 2210 in the scanned image of the second side of the double-sided document 2204. A similar equivalence in the coordinates of the positive image of the thin arrow 2212 and the bled-through image of the thin arrow 2214 is also observed.

The scanned image of the first side of the double-sided-document page 2202 can be considered to be a first signal Z, and the scanned and aligned image of the second side of the double-sided-document page 2204 can be considered to be a second, corresponding signal Z'. These two signals can be considered to together constitute a combined signal (Z,Z') that can be subject to DUDE-CTI denoising. For example, when each of the signals Z and Z' consists of samples of m bits, the combined signal (Z,Z') can be regarded as 2m-bit super samples. With appropriate ordering of the bits, properties of continuity, or smoothness, of the image data assumed by the DUDE-CTI scheme can be reasonably assumed to also hold for the combined signal, and straightforward variants of the DUDE-CTI embodiments can be implemented for the super symbols. Alternatively, the contexts, prediction, quantization, and rough denoising steps of DUDE-CTI can be designed to operate on 2-dimensional vectors rather than scalar quantities. This technique can, in alternative embodiments, be extended to combine a number of mutually interfering signals greater than two, n, that each comprises samples of m bits, into nm-bit super samples. In FIG. 22, the aligned, clean images of the first side of the double-sided document page 2218 is shown below the scanned image of the first side of the double-sided document page 2202, and the reflected, ideal, clean image 2220 of the second side of the double-sided-document page is shown below the reflected and aligned scanned image of the second side of the double-sided document page 2204. The aligned first-side and reflected second-side ideal images can be considered to be clean signals X and X'. The intensity values of pixels within the scanned Z and Z' signals can be considered to be related to the intensity values of the pixels within the X and X' clean signals by the following two, parametric, model equations:

$$Z_{i,j} = X_{i,j} + \alpha X'_{i,j} + N_{i,j}$$

$$Z'_{i,j} = X'_{i,j} + \alpha X_{i,j} + N'_{i,j}$$

where α corresponds to the degree of bleed-through;

N corresponds to the non-bleed-through noise in the scanned image of the first side; and N' corresponds to the non-bleed-through noise in the scanned image of the second side.

This simple, parametric model for the signals Z and Z' is sufficient to model noise introduced into front-side and back-side images of many double-sided-document pages in which bleed-through noise is a significant component of the total noise. However, more complex models may be employed when the bleed-through noise is not constant, but varies significantly depending on the location within a page at which the noise is observed. Such non-uniformities can occur when the bleed-through noise is affected by variations in physical properties of the page or printing ink in location-dependent manners, or by variations in the scanning process, such as position-dependent variations in intensity of illumination, sensitivity of photo detection, and other characteristics.

The relationship between the Z and Z' components of the combined signal (Z, Z'), generally expressed by the parameters $\alpha$, N, and N', can be incorporated into the channel noise model $\Pi$. By incorporating these parameters into the channel noise model $\Pi$, the DUDE-CTI can efficiently denoise a combined signal consisting of scanned images of both sides of a double-sided-document page, making use of the redundant information in the combined signal consisting of aligned ideal and bled-through images for both sides of the doubled-sided-document page.

Figure 23:
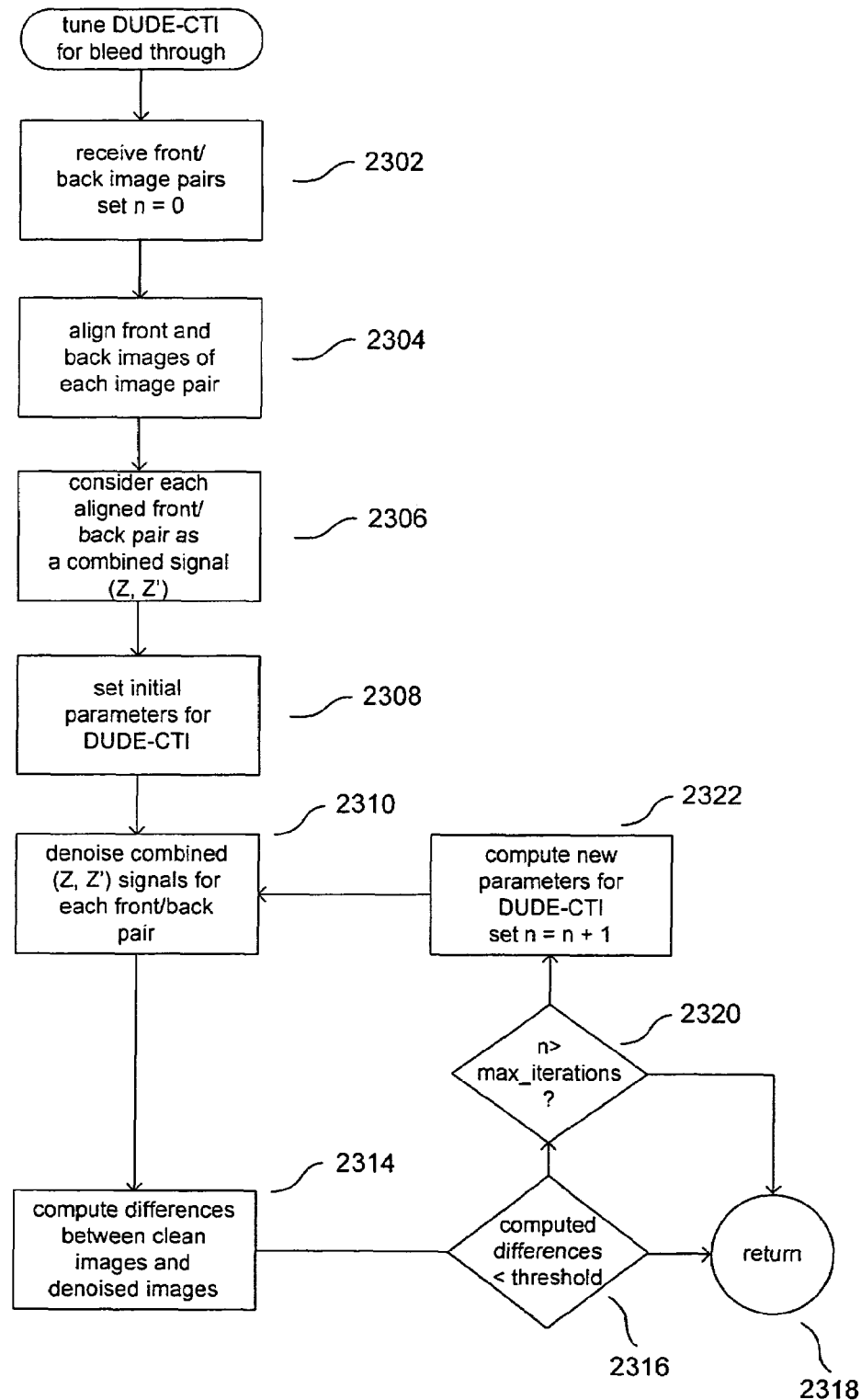
FIG. 23 is a control-flow diagram illustrating tuning of the DUDE-CTI for denoising combined signals consisting of the scanned images of both sides of a double-sided-document page according to an embodiment of the present invention.

FIG. 23 is a control-flow diagram illustrating tuning of the DUDE-CTI for denoising combined signals consisting of the scanned images of both sides of a double-sided-document page according to an embodiment of the present invention. In step 2302, the routine receives a set of scanned-image/clean quadruples, each quadruple including ideal images of the front and back sides of a double-sided page and scanned images of the front and back sides of the double-sided page. Also in step 2302, an iteration variable n is set to 0. Next, in step 2304, the front and back scanned images of each quadruple are aligned, by the process discussed above with reference to FIGS. 20-22. In step 2306, the aligned front and back scanned images of each pair are considered to be a combined signal (Z, Z'). In step 2308, the DUDE-CTI is configured with initial, default parameters. In step 2310, each (Z, Z') combined signal is denoised using the DUDE-CTI. Next, in step 2314, the denoised signal is compared with the clean signals, for each quadruple, to produce differences, and the differences are summed or averaged to produce a difference metric for the set of quadruples. In step 2316, the difference metric is compared with a threshold value. If the value of the difference metric is below the threshold value, then satisfactory tuning for denoising has been accomplished, and the tuning routine returns 2318. Otherwise, in step 2320, the iteration variable n is compared with a configurable maximum number of iterations, and if n is greater than the maximum number of iterations, the routine returns in step 2318. Otherwise, in step 2322, new parameters representing adjustments of the previously used parameter values for the DUDE-CTI are computed using an optimization-trajectory method, exhaustive search method, or another method, and the iteration variable n is incremented in preparation for a next iteration of denoising and combined signal computation in steps 2310, 2312, and 2314.

Figure 24:
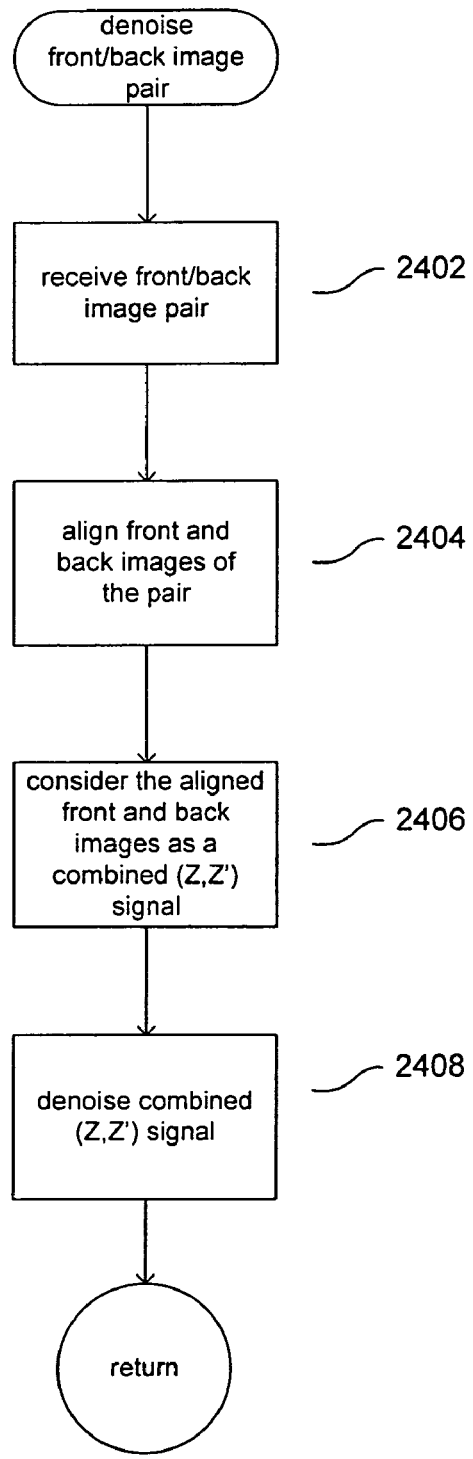
FIG. 24 is a control-flow diagram illustrating DUDE-CTI-based denoising of double-sided-document pages according to an embodiment of the present invention.

FIG. 24 is a control-flow diagram illustrating DUDE-CTI-based denoising of double-sided-document pages according to an embodiment of the present invention. In step 2402, scanned images of the front and back sides of the page are received. In step 2404, the front and back images are aligned, by the methods discussed above with reference to FIGS. 20-22. In step 2406, the aligned front and back images are considered as a combined signal (Z, Z') which is denoised in step 2408 by a suitably tuned DUDE-CTI.

Although the present invention has been described in terms of a particular embodiment, it is not intended that the invention be limited to this embodiment. Modifications within the spirit of the invention will be apparent to those skilled in the art. For example, additional steps can be taken to initially filter, by subtractive filtering, the front and back images of a double-sided image prior to tuning or applying a suitable DUDE or DUDE-CTI. Many additional types of noise models can be incorporated in the channel noise model $\Pi$. Tuning of a DUDE-CTI for double-sided-document denoising may be carried out using many quadruples comprising front and back, clean and noisy images, or, alternatively, may be carried out by minimizing differences between (Z, Z') combined signals and ideal (X, X') signals computed from them. DUDE-CTI tuning for, and denoising of, double-sided, printed documents may be implemented in an essentially limitless number of different software or combined software and hardware implementations, using many different control structures, modular organizations, data structures, programming languages, and other such parameters. Although the described embodiments of the present invention have been discussed with respect to denoising images of double-sided pages, the embodiments of the present invention may be applied to pair-wise denoising of many different types of paired signals, or to denoising higher multiplicities of related signals, including denoising of digitized signals extracted from analog stereo channels stored on a multi-track magnetic tape, to film-encoded images or celluloid movie film stored in such a way that chemical exchange between physically adjacent films or frames results in interfering images, or superimposed partial or complete images on each of the adjacent films or frames. Additional types of interfering signals may include crossed or interfering audio signals, ghost data underlying newly stored data on magnetic disks or other data-storage media, and many additional types of interfering signals.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for denoising n equals two or more mutually interfering signals, the method comprising: using a processor:
    selecting a discrete universal denoiser method that denoises n mutually interfering signals;
    tuning the discrete universal denoiser to denoise the n mutually interfering signals; and
    denoising the n mutually interfering signals by applying the tuned discrete universal denoiser to the n mutually interfering signals.

2. The method of claim 1 wherein the selected discrete universal denoiser denoises a signal by:
  determining symbol-transition probabilities for the noise-introducing signal-acquisition process;
  determining a measure of distortion produced with respect to a clean signal corresponding to the noisy signal by substituting a given replacement symbol for a given clean symbol;
  counting occurrences of symbols within contexts in the noisy signal; and
  replacing symbols in the noisy signal with replacement symbols that provide a smallest estimated distortion with respect to the clean signal corresponding to the noisy signal.

3. The method of claim 1 wherein tuning the discrete universal denoiser to denoise the n mutually interfering signals further includes:
  receiving n pairs of noisy and corresponding clean signals;
  selecting initial discrete universal denoiser parameters; and
  iteratively
    denoising the noisy signal composed of n mutually interfering signals to produce a corresponding denoised signal associated with the n mutually interfering signals,
    comparing the denoised signal associated with n mutually interfering signals to the clean signals, and
    adjusting discrete universal denoiser parameters.

4. The method of claim 3 wherein the iterative denoising, comparing, and adjusting steps are carried out until the differences between the denoised signal associated with each set of n mutually interfering signals and the clean signals associated with the set of n mutually interfering signals meet one or more predetermined criteria, the one or more predetermined criteria including one or more of:
  the differences falling below a threshold value;
  the differences representing a local minimum; and
  the differences representing a global minimum.

5. The method of claim 3 wherein the iterative denoising, comparing, and adjusting steps are repeated until a maximum number of iterations have been carried out.

6. The method of claim 3 wherein the discrete universal denoiser parameters include:
  a channel noise model $\Pi$;
  a distortion model;
  a number of contexts;
  sizes and geometries of the contexts,
  a number of iterations in various DUDE-CTI iterative embodiments, and
  a number of recursions in various DUDE-CTI recursive embodiments.

7. A system that includes a signal denoising component that denoises a set of n mutually interfering noisy signals obtained by a noise-introducing signal-acquisition process, the denoising component including:
  an embodiment of a selected discrete universal denoiser method that denoises noisy signals, tuned for denoising n mutually interfering noisy signals.

8. A method for denoising images of double-sided-document pages obtained by a noise-introducing image-acquisition process, the method comprising: using a processor:
  selecting a discrete universal denoiser method that denoises noisy images;
  tuning the discrete universal denoiser to denoise images of double-sided-document pages; and
  denoising images of double-sided-document pages by applying the tuned discrete universal denoiser to the images of double-sided-document pages.

9. The method of claim 8 wherein the selected discrete universal denoiser denoises a noisy image by:
  determining symbol-transition probabilities for the noise-introducing image-acquisition process;
  determining a measure of distortion produced with respect to a clean image by substituting a given replacement symbol for a given clean symbol;
  counting occurrences of symbols within contexts in the noisy image; and
  replacing symbols in the noisy image with replacement symbols that provide a smallest estimated distortion with respect to the clean image corresponding to the noisy image.

10. The method of claim 8 wherein tuning the discrete universal denoiser to denoise images of double-sided-document pages further includes:
  receiving pairs of noisy and corresponding clean images;
  selecting initial discrete universal denoiser parameters; and
  iteratively
    denoising the noisy image of each pair of images to produce a corresponding denoised image associated with the pair,
    comparing the denoised image associated with each pair of images to the clean image of the pair of images, and
    adjusting discrete universal denoiser parameters.

11. The method of claim 10 wherein the iterative denoising, comparing, and adjusting steps are carried out until the differences between the denoised image associated with each pair of images and the clean image of the pair of images meet one or more predetermined criteria, the one or more predetermined criteria including one or more of:
  the differences falling below a threshold value;
  the differences representing a local minimum; and
  the differences representing a global minimum.

12. The method of claim 10 wherein the iterative denoising, comparing, and adjusting steps are repeated until a maximum number of iterations have been carried out.

13. The method of claim 10 wherein the discrete universal denoiser parameters include:
  a channel noise model $\Pi$;
  a distortion model;
  a number of contexts;
  sizes and geometries of the contexts,
  a number of iterations in various DUDE-CTI iterative embodiments, and
  a number of recursions in various DUDE-CTI recursive embodiments.

14. A system that includes an image denoising component that denoises images of double-sided-document pages obtained by a noise-introducing image-acquisition process, the denoising component including:
  an embodiment of a selected discrete universal denoiser method that denoises noisy images, tuned for denoising double-sided-document pages.

15. A method for denoising images of double-sided-document pages obtained by a noise-introducing image-acquisition process, the method comprising: using a processor:
  selecting a discrete universal denoiser method that denoises noisy images;
  tuning the discrete universal denoiser to denoise pairs of images, each pair comprising an image of a front-side and an image of a back-side of a double-sided-document page; and pairwise denoising images of the front and back sides of double-sided-document pages by, for each double-sided-document page, aligning the image of the front-side and the image of the back-side of the double-sided-document page and applying the tuned discrete universal denoiser to a combined signal comprising the image of the front-side and the image of the back-side of the double-sided-document page.

16. The method of claim 15 wherein the selected discrete universal denoiser denoises a combined signal comprising the image of the front-side and the image of the back-side of the double-sided-document page by:
    determining symbol-transition probabilities for the noise-introducing image-acquisition process that include a degree of bleed-through $\alpha$;
    determining a measure of distortion produced with respect to a clean image by substituting a given replacement symbol for a given clean symbol;
    counting occurrences of symbols within contexts in both the image of the front-side and the image of the back-side of the double-sided-document page; and
    replacing symbols in the image of the front-side and the image of the back-side of the double-sided-document page with replacement symbols that provide a smallest estimated distortion with respect to the clean images corresponding to the noisy image of the front-side and the image of the back-side of the double-sided-document page.

17. The method of claim 15 wherein tuning the discrete universal denoiser to denoise double-sided-document pages further includes:
    receiving quadruples of images, each quadruple including noisy images of the front-side and back-side of a double-sided-document page and corresponding clean images of the front-side and back-side of the double-sided-document page;
    selecting initial discrete universal denoiser parameters; and
    iteratively
        aligning the image of the front-side and the image of the back-side of the double-sided-document page in each quadruple,
        denoising the aligned noisy images of each quadruple of images by applying the discrete universal denoiser to a combined signal comprising the image of the front-side and the image of the back-side of the double-sided-document page to produce corresponding denoised images associated with the quadruple,
        comparing the denoised images associated with each quadruple of images to the corresponding clean images of the quadruple of images, and
        adjusting discrete universal denoiser parameters.

18. The method of claim 17 wherein the iterative aligning, denoising, comparing, and adjusting steps are carried out until the differences between the denoised images associated with each quadruple of images and the clean image of the pair of images meet one or more predetermined criteria, the one or more predetermined criteria including one or more of:
    the differences falling below a threshold value;
    the differences representing a local minimum; and
    the differences representing a global minimum.

19. The method of claim 17 wherein the iterative aligning, denoising, comparing, and adjusting steps are repeated until a maximum number of iterations have been carried out.

20. The method of claim 17 wherein the discrete universal denoiser parameters include:
    a channel noise model $\Pi$, including the degree of bleed through $\alpha$;
    a distortion model;
    a number of contexts;
    sizes and geometries of the contexts,
    a number of iterations in various DUDE-CTI iterative embodiments, and
    a number of recursions in various DUDE-CTI recursive embodiments.

21. A system that includes an image denoising component that pairwise denoises images of front and back sides of double-sided-document pages obtained by a noise-introducing image-acquisition process, the denoising component including:
    an embodiment of a selected discrete universal denoiser method that denoises combined signals, each combined signal comprising the front-side and back-side noisy images of a double-sided-document page, the selected discrete universal denoiser method tuned for denoising double-sided-document pages.

* * * * *